(12) United States Patent
Miura et al.

(10) Patent No.: US 9,076,027 B2
(45) Date of Patent: Jul. 7, 2015

(54) AUTHENTICATION SYSTEM USING BIOMETRIC INFORMATION AND AUTHENTICATION DEVICE

(75) Inventors: Naoto Miura, Kokubunji (JP); Harumi Kiyomizu, Inagi (JP); Akio Nagasaka, Kokubunji (JP); Takafumi Miyatake, Hachioji (JP); Yusuke Matsuda, Tachikawa (JP)

(73) Assignee: HITACHI INDUSTRY & CONTROL COLUTIONS, LTD., Ibaraki (JP)

( * ) Notice: Subject to any disclaimer, the term of this patent is extended or adjusted under 35 U.S.C. 154(b) by 346 days.

(21) Appl. No.: 13/510,320

(22) PCT Filed: Nov. 17, 2009

(86) PCT No.: PCT/JP2009/069754
§ 371 (c)(1),
(2), (4) Date: May 17, 2012

(87) PCT Pub. No.: WO2011/061862
PCT Pub. Date: May 26, 2011

(65) Prior Publication Data
US 2012/0230555 A1 Sep. 13, 2012

(51) Int. Cl.
*G06K 9/62* (2006.01)
*G06K 9/00* (2006.01)
*G06K 9/68* (2006.01)

(52) U.S. Cl.
CPC ........ *G06K 9/00087* (2013.01); *G06K 9/00926* (2013.01); *G06K 9/00979* (2013.01); *G06K 9/6807* (2013.01); *G06K 2009/00932* (2013.01)

(58) Field of Classification Search
None
See application file for complete search history.

(56) References Cited

U.S. PATENT DOCUMENTS

| 5,999,637 A * | 12/1999 | Toyoda et al. ................ 382/124 |
| 2005/0152583 A1 | 7/2005 | Kondo et al. |
| 2005/0180636 A1 | 8/2005 | Iizuka |
| 2008/0212846 A1 | 9/2008 | Yamamoto et al. |
| 2008/0219503 A1 * | 9/2008 | Di Venuto et al. ............ 382/103 |
| 2010/0164684 A1 * | 7/2010 | Sasa et al. .................... 340/5.83 |

FOREIGN PATENT DOCUMENTS

| JP | 2001-092961 | 4/2001 |
| JP | 2003-099780 | 4/2003 |
| JP | 2004-258963 | 9/2004 |

(Continued)

OTHER PUBLICATIONS

Machine translation of JP 2004-258963, to Ikegami Jun et al., published on Sep. 16, 2004, 27 pages total.*

*Primary Examiner* — Brian P Werner
(74) *Attorney, Agent, or Firm* — Baker Botts L.L.P.

(57) ABSTRACT

It is provided an authentication system comprising: an input device; an image pickup device for picking up an image of the living body; an image processing unit for processing the image picked up by the image pickup device; a storage device for storing a plurality of pieces of first feature data and a plurality of pieces of second feature data; and a matching processing unit for checking input data, which indicates features of a living body picked up by the image pickup device, against each of the plurality of pieces of first feature data and each of the plurality of pieces of second feature data. Each of the plurality of pieces of second feature data is data that is smaller in size than each of the plurality of pieces of first feature data and that includes at least a part of the features of the living body.

12 Claims, 25 Drawing Sheets

(56) References Cited

FOREIGN PATENT DOCUMENTS

| JP | 2004-265353 | 9/2004 |
| JP | 2004-362619 | 12/2004 |
| JP | 2005-215883 | 8/2005 |
| JP | 2006-252225 | 9/2006 |
| JP | 2008-171094 | 7/2008 |
| JP | 2008-250508 | 10/2008 |

* cited by examiner

| TERMINAL | REGISTERED PERSON ID |
|---|---|
| A | 0 - 1999 |
| B | 1000 - 2999 |
| C | 4000 - 5999 |
| D | 4000 - 5999 |
| ... | ... |

| TERMINAL | A | B | C | D | ... |
|---|---|---|---|---|---|
| A | — | 200 | 500 | 6500 | ... |
| B | — | — | 300 | 6300 | ... |
| C | — | — | — | 6000 | ... |
| D | — | — | — | — | ... |
| ... | — | — | — | — | — |

| REGISTRATION TIME \ REGISTERED PERSON ID | 0001 | 0002 | 0003 | ... |
|---|---|---|---|---|
| 10:00 - | ≈ | ≈ | | ... |
| 12:00 - | ≈ | ≈ | ≈ | ... |
| 14:00 - | ≈ | | | ... |
| ... | ... | ... | ... | ... |

*Fig. 20B*

AUTHENTICATION SYSTEM USING BIOMETRIC INFORMATION AND AUTHENTICATION DEVICE

BACKGROUND OF THE INVENTION

This invention relates to an authentication system that uses a living body to authenticate an individual, and more particularly, to a quick, high-precision, authentication technology.

Of various biometric authentication technologies, finger vein authentication is known to be capable of highly precise authentication. Finger vein authentication, which uses vein patterns inside a finger, excels in authentication precision and is harder to falsify and alter than fingerprint authentication, thereby accomplishing a high level of security.

In recent years, cases are increasing in which a biometric authentication device is mounted to a cellular phone, a notebook personal computer (PC), a personal digital assistant (PDA), or other portable terminals, or to such equipment as a locker, a safe, or a printer to ensure the security of the equipment. Biometric authentication is also beginning to be applied to payment and other fields in addition to entrance/exit management, attendance management, login to computers, and the like. With the resultant increase in the number of people who use authentication systems, authentication systems are demanded to improve their throughput. From this viewpoint, 1:N authentication in which only a living body is used to execute authentication without an ID card is preferred to 1:1 authentication in which a living body is presented after registered data is uniquely identified by entering a personal identification number (PIN) or presenting an ID card and which accordingly lowers the throughput.

A biometric authentication device described in JP 2005-215883 A, for example, is a known technology for speedily authenticating a large number of registered persons. The authentication device disclosed in JP 2005-215883 A involves a technology in which registered data is stored in a spatially shrunk state to execute quick matching between pieces of low resolution data.

JP 2008-250508 A discloses a method in which an expected time of arrival of a user at a terminal is used to calculate the probability of the presence of the person in question, and the order of cross-checking 1:N data is accordingly rearranged to find the person in question quickly.

JP 2004-362619 A discloses a technology in which information on the degree of pupil dilation to the iris is used to quickly search a plurality of pieces of registered data, and the amount of registered data is also kept down by omitting iris data registration when a plurality of iris images have similar Hamming distances.

PATENT LITERATURE

PATENT LITERATURE 1 JP 2005-215883 A
PATENT LITERATURE 2 JP 2008-250508 A
PATENT LITERATURE 3 JP 2004-362619 A

SUMMARY OF THE INVENTION

In order to implement 1:N authentication on a large scale, it is necessary to keep the authentication precision high while maintaining the speediness of authentication. Large-scale 1:N authentication, where a person needs to be checked against many pieces of registered data of other registered persons, is particularly susceptible to a false acceptance error in which a registered person is mistakenly identified as another registered person, or a non-registered person is identified as a registered person, and is high in false acceptance ratio (FAR). Lowering the false acceptance ratio is therefore an issue to be addressed. Another issue is that the huge amount of registered data requires lengthy processing time for matching and prolongs the waiting time of the user.

In the related technologies, in order to maintain the speediness of authentication, authentication processing is sped up by narrowing the number of pieces of data to check against and the authentication precision is raised by presenting a plurality of pieces of biometric information. However, balancing speediness and high precision has been difficult.

The device disclosed in JP 2005-215883 A is capable of searching registered data quickly, but JP 2005-215883 A does not disclose how to accomplish high precision in authentication.

The device disclosed in JP 2008-250508 A is capable of quickly authenticating a registered person by changing the cross-checking order in accordance with the probability of the registered person initiating authentication. However, JP 2008-250508 A does not consider speeding up authentication when a registered person cannot be detected, such as when the living body presented is not positioned properly or when a non-registered person attempts to initiate authentication. JP 2008-250508 A also does not consider guaranteeing precision with respect to erroneous recognition in which a registered person is detected but false acceptance occurs.

JP 2004-362619 A includes suggestions for speeding up authentication by using a pupil dilation index to narrow matching targets down from a plurality of pieces of registered data. However, data sorted by this index includes many pieces that exhibit high similarity, even between different individuals, and thus makes quick authentication difficult. As to how the precision of matching is raised in various photographing states, sorting out registered data does reduce the number of pieces of registered data to check against but still leaves a plurality of pieces of selected registered data for matching, which makes it difficult to execute large-scale 1:N authentication quickly. The technology disclosed in JP 2004-362619 A is focused on reducing the amount of data registered for each individual, and does not include suggestions for how to authenticate a larger number of registered persons at high speed and with precision.

SUMMARY OF THE INVENTION

According to a typical example of the invention disclosed in this specification, there is provided an authentication system for authenticating an individual by using features of a living body, including: an input device, on which the living body is put; an image pickup device for photographing the living body; an image processing section for processing an image that is photographed by the image pickup device; a storage device for storing a plurality of pieces of first feature data, which include the features of the living body and are registered in advance, and a plurality of pieces of second feature data which are generated by the image processing section from the plurality of pieces of first feature data, respectively; and a matching processing unit for matching input data, which indicates features of a living body photographed by the image pickup device, against each of the plurality of pieces of first feature data and each of the plurality of pieces of second feature data, in which each of the plurality of pieces of second feature data is data that is smaller in size than each of the plurality of pieces of first feature data and that includes at least a part of the features of the living body.

According to this invention, a large-scale biometric authentication system that is speedy and highly convenient is provided while keeping authentication precision high.

BRIEF DESCRIPTION OF THE DRAWINGS

FIGS. 20A and 20B is a diagram illustrating an overall configuration of a biometric authentication system according to a sixth embodiment.

DETAILED DESCRIPTION OF THE PREFERRED EMBODIMENTS

Embodiments of this invention are described below with reference to the drawings.

First Embodiment

Figure 1:
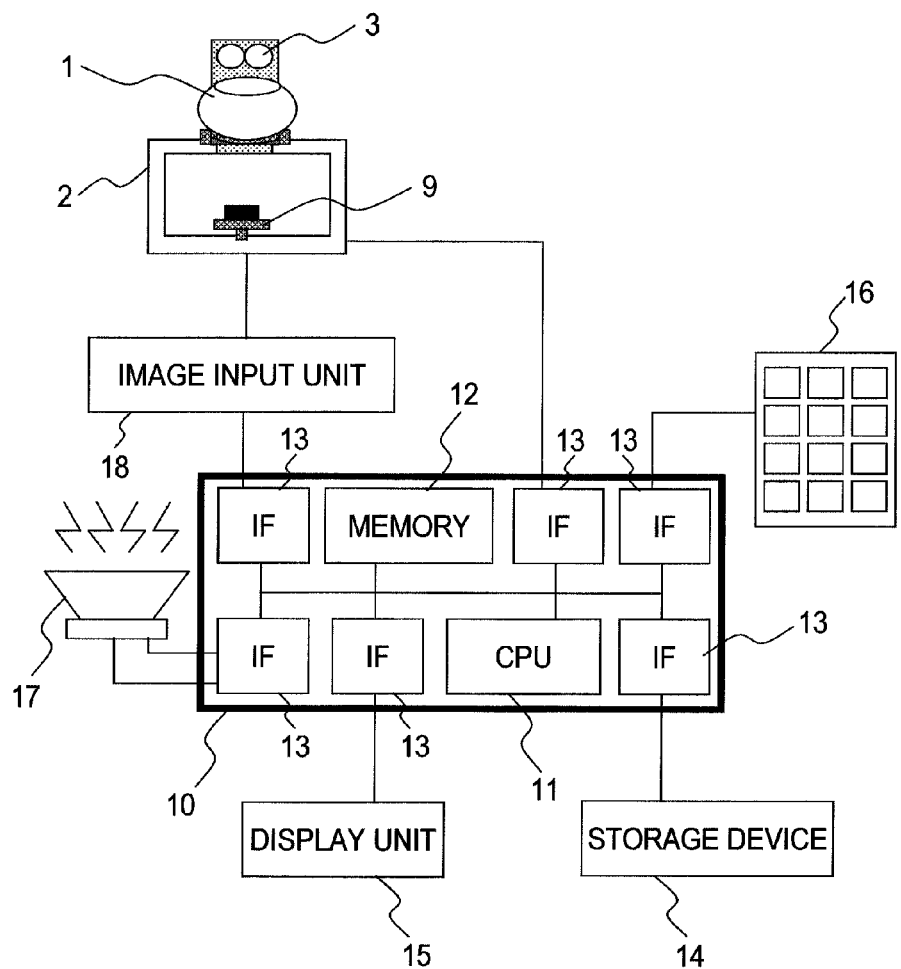
FIG. 1 is a diagram illustrating an overall configuration of a biometric authentication system according to a first embodiment.

FIG. 1 is a diagram illustrating the overall configuration of a biometric authentication system that uses finger veins according to a first embodiment.

The authentication system of the first embodiment includes an input device 2, an authentication processing unit 10, a storage device 14, a display unit 15, an input unit 16, a speaker 17, and an image input unit 18.

The input device 2 includes a light source 3 installed on a casing of the input device 2, and an image pickup device 9 set inside the casing. A part of the authentication processing unit 10 that has an image processing function, or the image processing function plus the image input unit 18, may be referred to as an image processing section. In any case, the authentication processing unit 10 has an image processing function.

The light source 3 is, for example, a light emitting device such as an infrared light emitting diode (LED) and irradiates a finger 1 presented on the input device 2 with infrared light. The image pickup device 9 photographs an image of the finger 1 presented on the input device 2.

The image input unit 18 obtains an image photographed by the image pickup device 9 of the input device 2, and inputs the obtained image to the authentication processing unit 10.

The authentication processing unit 10 includes a central processing unit (CPU) 11, a memory 12, and various interfaces (IFs) 13.

The CPU 11 performs various types of processing by executing programs that are stored in the memory 12. The memory 12 stores programs executed by the CPU. The memory 12 also temporarily stores an image input from the image input unit 18.

The interfaces 13 connect the authentication processing unit 10 and external devices. Specifically, the interfaces 13 connect to the input device 2, the storage device 14, the display unit 15, the input unit 16, the speaker 17, the image input unit 18, and others.

The storage device 14 stores registered data of users in advance. The registered data is information against which users are checked, for example, images of finger vein patterns. A finger vein pattern image is usually an image in which blood vessels under the skin of a finger pad (finger veins) are picked up as a pattern of dark shadows.

The display unit 15 is, for example, a liquid crystal display and is an output device that displays information received from the authentication processing unit 10.

The input unit 16 is, for example, a keyboard and transmits information entered by a user to the authentication processing unit 10. The speaker 17 is an output device that sends out in the form of aural signals (for example, a voice) information received from the authentication processing unit 10.

Figure 2:
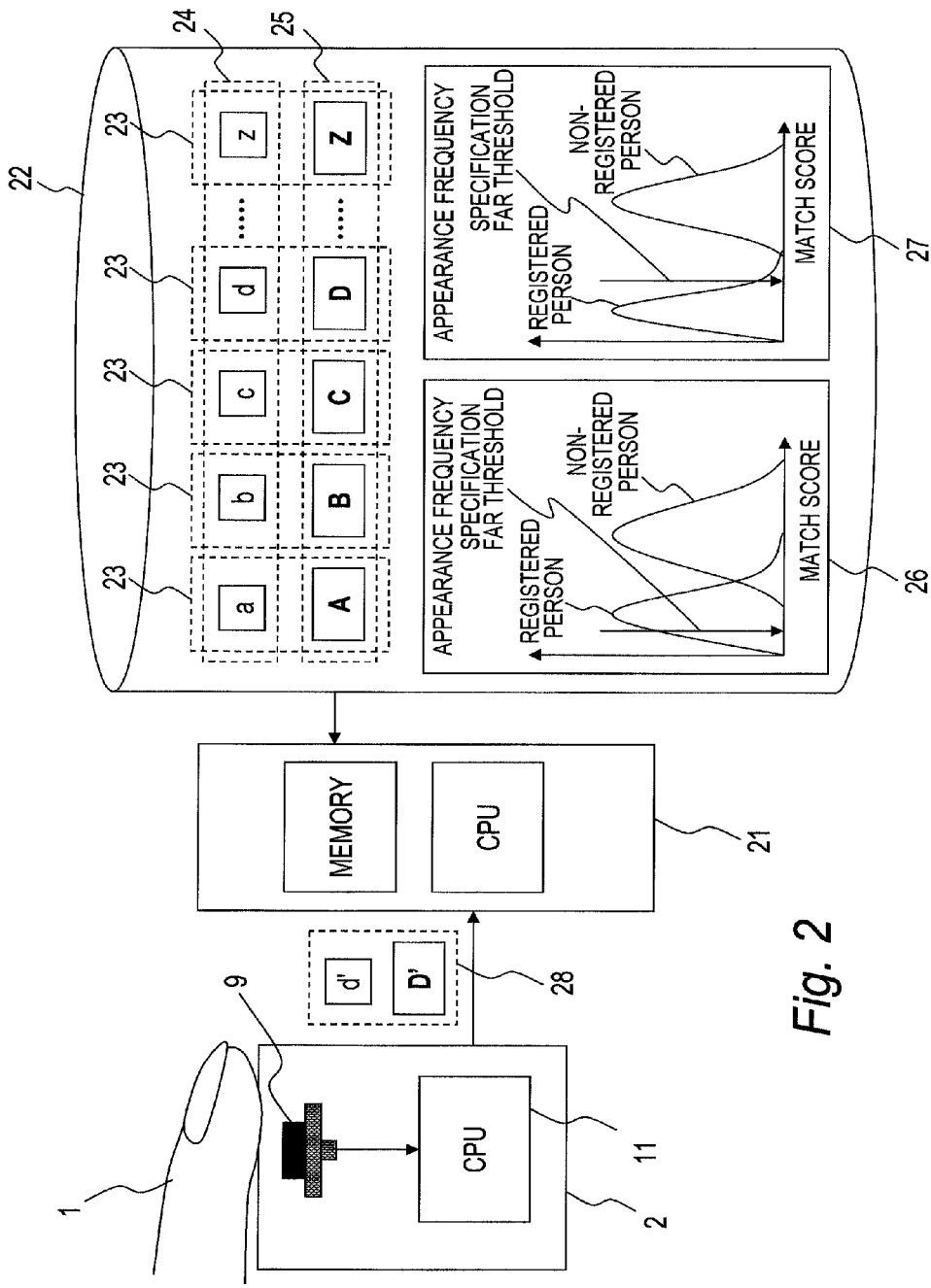
FIG. 2 is a diagram illustrating an operation of the biometric authentication system according to the first embodiment.

FIG. 2 is a diagram illustrating the operation of the biometric authentication system according to the first embodiment.

The large-scale 1:N biometric authentication system of FIG. 2 holds, for each piece of biometric information, registered data in a plurality of sizes to check against. While matching on multiple layers, the authentication system rearranges registered data for the next layer and, at the time a predetermined false acceptance ratio is met further, completes authentication.

The large-scale 1:N biometric authentication system of FIG. 2 includes the input device 2, an authentication server 21 connected to the input device 2, and a registration database 22 coupled to the authentication server 21. Another central processing unit (CPU) 11 is included in the input device 2. The authentication server 21 includes a central processing unit (CPU), which performs various types of processing by executing programs, a memory, which stores programs executed by the CPU, and interfaces connected to other devices.

1:N authentication is an authentication method in which a user who attempts to initiate authentication (an authentication subject) presents only biometric information to an authentication device without specifying his/her own registered data by entering an ID or the like, and the biometric information is checked against all of a plurality of (N) pieces of data registered in the system to identify which of registered persons is this user. Generally speaking, when the number of pieces of registered data is larger, the response is slower and the probability of misidentifying a registered person is higher. It is therefore important to study speed improvement and precision improvement both when putting 1:N authentication into practice.

Registered data 23 of biometric information is stored in the registration database 22 coupled to the authentication server 21. The registered data 23 is feature data of a photographed part of a living body (matching data). By comparing the registered data 23 against input data presented by a user, a match score is calculated which is the quantification of how similar the features of the two are to each other. The match score is a numerical value indicating similarities and differences between the two. The matching data can be a feature amount that is commonly used in biometric authentication, for example, a template image in which a line drawing of a finger print or of veins is enhanced, feature point information such as the position and direction of a branching point or an end point in a line drawing, the branching count, the luminance gradient direction, and the sharpness of image quality, or structural data indicating a connection relation between feature points.

Each piece of registered data 23 is constituted of a plurality of pieces of data prepared in different sizes for the same living body. Each piece of registered data 23 in this embodiment is constituted of two pieces of data: registered data 25 which has a normal size and reduced data 24 which is smaller in information amount than the normal size (for example, ¼ of the normal size). The reduced data 24 is used to execute rough matching processing quickly and makes it possible to detect registered data that matches the input living body at an early stage. The reduction ratio and the number of reduced data to be generated can be determined arbitrarily, depending on the speed of matching processing.

In the case where the registered data is a template image, for example, the reduced data 24 can be an image that is obtained by shrinking the template image spatially, an image obtained by extracting a part of the template image, an image in which the gradation of each pixel is reduced, or the like. In the case where the registered data is structural data, the reduced data 24 can be generated by, for example, obtaining the sharpness of each feature point and removing a feature point that is low in sharpness. The sharpness of each feature point is obtained by calculating, with respect to a living body image used to calculate feature points, the S/N ratio of a part of the living body image that corresponds to the feature point.

The registered data is generated in the input device 2 by photographing a living body, generating feature data of the living body with the CPU 11, and further executing reduction processing for this data a plurality of times. Every piece of generated registered data is stored in the registration database 22. Instead the input device 2 may execute only the photographing of a living body and the transfer of a photographed image to the server 21, where the CPU of the server 21 generates feature data, executes processing of reducing the generated registered data, and stores the generated feature data and the reduced data in the registration database 22.

As will be described later, matching is executed between pieces of matching data reduced to the same size and a match score is obtained as a result of the matching. The match score here is the degree of difference. In other words, the match score is low when the same living body as a registered one is input, and is high when a living body different from a registered one is input.

Whether a user is successfully authenticated is determined by whether the match score of input data 28 with respect to a piece of registered data 23 is lower than an authentication threshold set in advance. When the match score is lower than the authentication threshold, it means that the pattern of the input data 28 and the pattern of the registered data 23 are similar to each other and that the user who has presented this input data is likely to be a registered person, and it is therefore determined that the user is successfully authenticated. When the match score is not lower than the authentication threshold against any piece of registered data 23, on the other hand, the user is denied authentication. It is recommended to normalize the match score between 0 and 1.

The frequency of appearance of the match score varies depending on whether the match score is obtained as a result of matching between pieces of data of the same living body or between pieces of data of different living bodies. In the case of matching between pieces of data of the same living body, the similarity is high and the match score is accordingly low. In the case of matching between pieces of data of different living bodies, the match score is high. The distribution of the match score has a constant width. An average distance between the distribution of the same-living body match score and the distribution of the different-living body match score varies depending on what biometric information, processing method, and data reduction ratio are used. When the distance between the former distribution and the latter distribution is greater, the precision of authentication is higher.

Accordingly, at each reduction ratio, the frequency of appearance of the same-living body match score and the frequency of appearance of the different-living body match score are evaluated in advance with the use of reduced data, and results of the evaluation are kept in the registration database 22. In this embodiment, two sets of results are kept which are a match score appearance frequency distribution 26 of reduced data and a match score appearance frequency distribution 27 of normal data. An authentication threshold is set for each distribution.

In the match score appearance frequency distribution 26 of reduced data, the same-living body distribution and the different-living body distribution are close to each other and it is therefore difficult to determine whether pieces of data are of the same living body. In the match score appearance frequency distribution 27 of normal data, on the other hand, the distance between the same-living body distribution and the different-living body distribution is larger than that of reduced data, and it is easy to determine whether pieces of data are of the same living body. Because the distribution in matching that uses reduced data and the distribution in matching that uses normal data thus differ from each other, the authentication threshold for reduced data and the authentication threshold for normal data are different values. The authentication threshold is closely related to the false acceptance ratio as will be described later, and is set so as not to exceed an upper limit false acceptance ratio, which is set to the authentication system in advance.

Authentication steps are outlined as follows:

First, a user presents a living body (here, the finger 1) to the input device 2 and the image pick up device 9 photographs the presented finger 1. The CPU 11 generates data (input data) 28 of the input living body. At this point, two pieces of input data that have different reduction ratios are generated as in the generation of registered data, and the generated pieces of input data 28 are transferred to the server 21. The server 21 checks the input data 28 against every piece of registered data, and ultimately determines whether the user is successfully authenticated or not.

The number of registered persons is assumed to be large in this invention. The registration database 22 has a capacity large enough to store many pieces of registered data, and registered data is registered in advance. This invention also considers a case where an unregistered person presents a living body to the input device 2. In the following description, pieces of reduced data 24 of all registered persons are collectively referred to as reduced data group, and pieces of normal-size registered data 25 of all registered persons are collectively referred to as normal data group.

A design policy about the error ratio in 1:N authentication according to this embodiment is described. The error ratio is classified generally into the ratio of false rejection in which a registered user fails to be authenticated (FRR: False Rejection Ratio) and the ratio of false acceptance in which a non-registered person is mistakenly authenticated (FAR: False Acceptance Ratio). In large-scale 1:N authentication systems, in particular, while the risk of false rejection is approximately the same as in conventional 1:1 authentication, where a person is checked against one piece of registered data uniquely specified with the use of an ID or a PIN, the risk of false acceptance rises as the number of registered persons increases because a person is checked against all pieces of registered data. It is therefore important to avoid erroneously authenticating one person as another person as much as possible.

Improving the false acceptance ratio by simply changing the authentication threshold for the match score has a risk of a rise in false rejection ratio. In short, these two error ratios have a trade-off relation. The precision of 1:N authentication is thus in principle inferior to the precision of 1:1 authentication, and controlling the two erroneous authentication ratios in a manner suitable for 1:N authentication systems is therefore important.

This embodiment utilizes the following general character to control the trade-off of the erroneous authentication ratios:

The character utilized in this embodiment is that, because each user differs from another in familiarity with the device, the complexity of living body features, and the like, the false rejection ration varies from one user to another when a shared authentication threshold is set. If the security level is controlled under this situation so that the false rejection ratio is constant for all users, the risk of false acceptance varies from one user to another. For instance, when the false rejection ratio of a user who is prone to false rejection is controlled to have a fixed value, a threshold for successful authentication needs to be relaxed and the false acceptance ratio accordingly rises. As a result, input data of every non-registered person is erroneously authenticated as registered data of this user, possibly causing the authentication system to be of no use.

The authentication system of this embodiment is therefore designed under a policy in which the false rejection ratio is lowered while guaranteeing that the risk of erroneous authentication where one person is mistaken for another is equal to or less than a fixed value by setting an upper limit false acceptance ratio that the system can tolerate.

If the false acceptance ratio does not meet the requirement, the security of the system is ensured through the enhancement of precision which is accomplished by, for example, requesting a user to present a living body a plurality of times. This way, a user familiar with the device is authenticated at approximately the same false rejection ratio as in the related technologies, whereas a user unfamiliar with the device is correctly authenticated by presenting a living body a plurality of times or the like.

Figure 3A:
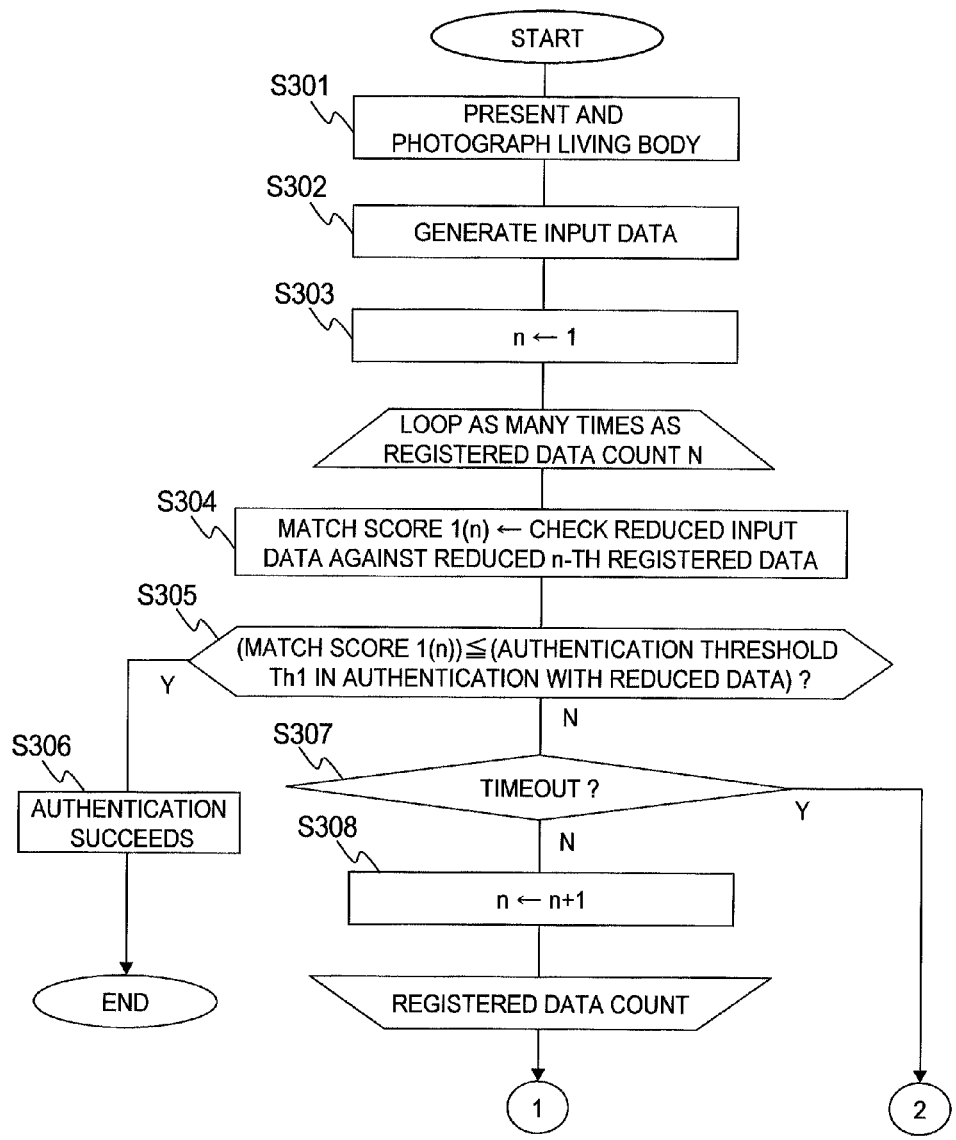
FIGS. 3A and 3B are flow charts illustrating authentication processing according to the first embodiment.
Figure 3B:
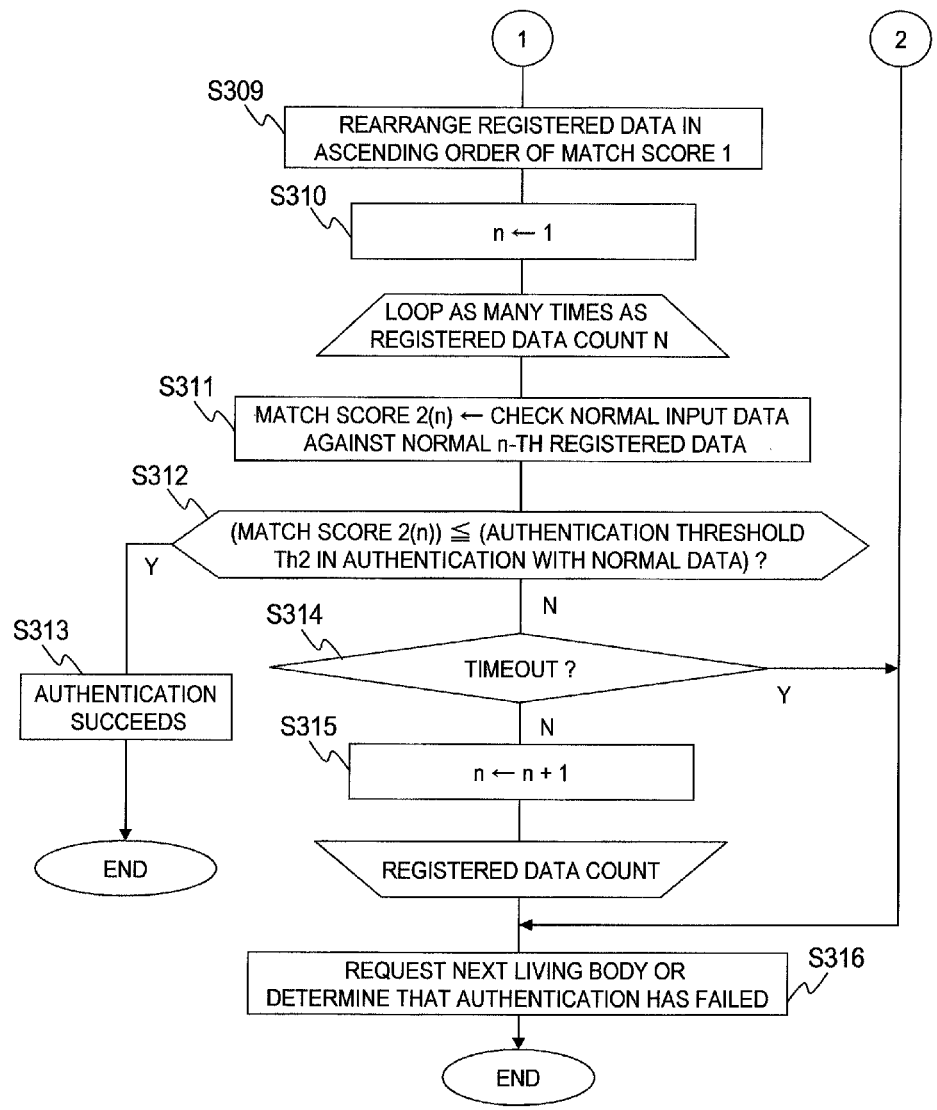

FIGS. 3A and 3B are flow charts illustrating authentication processing of the first embodiment.

Steps of matching processing are outlined first. Input data is checked first against all pieces of registered data on a layer where the reduced data size is smallest, then against all pieces of registered data on layers where the data size increase progressively, and lastly against all pieces of normal registered data which are not reduced in size. Matching is thus conducted sequentially from layers of small data sizes. Each time matching is completed for one layer, registered data of the next layer is rearranged in the descending order of similarity and then matched in the rearranged order.

If an authentication result that identifies the user as a registered person is obtained halfway through, authentication is ended at that point. If authentication is not finished even after matching is conducted on the final layer (data that is not reduced), the user is requested to further enter the living body or is denied authentication.

The authentication processing is described in detail below.

First, a user presents a living body to a terminal and the terminal photographs the presented living body (S301). The authentication system of this embodiment is a 1:N authentication system, and an ID or a PIN that identifies the user is not entered. The terminal detects the fact that a living body has been presented with, for example, a touch sensor, a push-button switch, or a change of images, and photographs the living body. At this point, the terminal controls a camera, a light source, and the like so that the living body is captured clearly. For example, when the living body is a finger and finger veins are photographed, the finger is irradiated with infrared light, transmitted light of the irradiating infrared light is photographed with an infrared camera, and the photographed image is evaluated for the luminance value and the sharpness of the veins. Therefore, feedback control is performed on the amount of irradiating infrared light and the finger is irradiated with infrared light at an appropriate intensity. When it is determined that the amount of infrared light has been controlled and the living body has been photographed properly, the photographing is completed.

Next, the input data 28 for matching is generated from the photographed living body information (S302). The input data 28 generated in S302 is information that can be compared against the registered data 25. Reduced data of a feature pattern that is created from the input data is also generated as is the case for the registered data 25. The reduction ratio and the number of pieces of generated data are the same as for the registered data, so that the reduced input data can be compared to the registered data reduced at the same ratio.

An example of the matching processing is described. For each piece of registered data, a numerical value indicating the similarity between the registered data and the input data (a match score) is obtained as a result of the matching processing. The match score in this embodiment indicates the degree of difference. The match score of input data with respect to registered data can be obtained by a method that is used in popular pattern recognition. For instance, when it is a template image that is match, the amount of difference can be obtained from the sum of squares of differences between overlapped pixel values. In the case where feature points are checked against each other, the similarity can be calculated with the use of the proportion of, to the total number of feature points, the number of feature points that are determined as similar to each other by comparing the attributes of the feature points.

Next, a variable n for identifying a piece of registered data is initialized to 1 as initialization of the matching processing (S303). The variable n corresponds to the order in which pieces of registered data are arranged and, when the value of n is 1, represents a piece of registered data at the head. In the case where the number of pieces of registered data is N and the value of n is N, n represents a piece of registered data at the tail end.

Next, reduced data of the presented living body information (input data) 28 is checked against reduced data of the n-th registered data (S304). The order of cross-checking registered data is determined in advance and the input data is checked against registered data in the determined order. The cross-checking order in the initial state (the first layer) is an arbitrarily set order such as the order of registration, the order of frequency of use, or the order of the importance of registered persons (for example, the order of job position or the order of customer importance level). In particular, setting the order so that persons whose frequency of use is high are checked first accomplishes fast matching of persons who frequently use the system and improves the overall throughput of the system.

Reduced data of the input data 28 is first checked against reduced data of the registered data 25 that is in the first place in the cross-checking order. Processing of checking reduced data against reduced data is lower in the precision of determining similarity/dissimilarity than in the case of normal data, but is fast because data to be matched is small in size. For example, when template images to be matched are each spatially reduced to ½ along one side of the image, the amount of calculation for pixel-by-pixel comparison is ¼, and the width by which images are shifted for a comparison of the two images that takes into account the spatial misalignment of the living body is ¼ as well. The total calculation amount is therefore 1/16.

Accordingly, matching of data spatially reduced to ½ against data spatially reduced to ½ can process 16 times more data than matching of normal-size registered data does within the same period of time. Processing of checking reduced data against reduced data is thus executed for all pieces of registered data in order. The data size and matching processing are designed so that at least matching of reduced data of the smallest size is executed within a timeout period, which is described later, for all pieces of registered data, thereby ensuring that none of the registered data is skipped in matching.

Next, whether or not the obtained match score is below an authentication threshold Th1 is determined (S305). The authentication threshold is set to a border match score at which the actual false acceptance ratio is lower than the preset false acceptance ratio of the authentication system. When the match score is lower than the authentication threshold, it is determined that the actual false acceptance ratio is lower than the preset false acceptance ratio and the authentication is deemed as a success. When the match score is equal to or higher than the authentication threshold, on the other hand, 1 is added to n (S308) in order to check against the next piece of registered data and matching is repeated in S304. The authentication threshold is determined by the probability distribution, and the authentication threshold for reduced data therefore takes a value different from that of the authentication threshold for normal data.

The relation between the authentication threshold and the error ratio is now described. According to the match score appearance frequency distribution 26 of FIG. 2, the result of matching of a registered person and the result of matching of a non-registered person are apart from each other. These two distributions can be used to evaluate the relation between the obtained match score and the probability of the user being a registered person. When a match score x is obtained, the probability of the result indicating a non-registered person is expressed by Expression (1) with the use of Bayesian probability.

$$P(I|x)=P(x|I)\times P(I)/P(x)=P(x|I)\times P(I)/\{P(x|G)+P(x|I)\} \quad (1)$$

where x represents the match score, G represents a registered person, and I represents a non-registered person.

Therefore, in the case where an authentication threshold Th is set for the match score x and authentication is deemed as a success when x≥Th is satisfied because of high similarity, the false acceptance ratio is expressed by Expression (2).

$$P(I|x \geq Th)=P(x \geq Th|I)\times P(I)/\{P(x \geq Th|G)+P(x \geq Th|I)\} \quad (2)$$

In other words, the probability of falsely accepting a non-registered person can be calculated by using two probability distributions: the registered person probability distribution and the non-registered person probability distribution. The false rejection ratio can similarly be calculated from the two probability distributions when Bayesian probability is used.

The registered person probability distribution and the non-registered person probability distribution are obtained generally by collecting a lot of actual measurement data. However, the following reasons make it difficult to uniformize conditions such as the quality of collected data and the number of pieces of collected data for the two, and the data reliability is usually inconsistent between the two:

First, in matching of a non-registered person where different feature amounts are checked against each other, the obtained degree of difference is high even when there is an external factor such as the authentication subject positioning a finger deliberately offset. In other words, what result will be obtained cannot be controlled at an authentication subject's will. A statistical distribution that is stable irrespective of the situation of photographing is consequently obtained. Furthermore, the number of pieces of authentication subject data from which the statistical distribution is created can readily be increased because, when data of K people is collected, for example, checking the collected data of K people against one another produces K×(K−1) non-registered person match scores. Raising the reliability of statistical data is accordingly easy.

In the case of a registered person, on the other hand, the similarity indicated by the match score is higher when the difference from the photographing situation at the time of registration is smaller, and is lower when the difference from the photographing situation at the time of registration is greater. In extreme cases where the photographed site is far off the registered site, the same living body presented by the same person may only yield as high a match score as one that is frequently scored in matching of a non-registered person. The result can therefore be unstable depending on how a living body is presented, as described above. Furthermore, compared to data of non-registered person match scores, collecting statistically reliable data is difficult in the collection of registered person match scores where only K pieces of data are obtained from K authentication subjects.

Considering these, when the probability distributions are utilized to calculate whether or not the authentication is a success, using the registered person distribution may be difficult in some cases. This embodiment therefore uses only the non-registered person distribution, which is relatively stable for observation, to thereby determine whether or not the authentication is a success. The use of Bayesian probability requires the registered person distribution and the non-registered person distribution both as described above, and hence the error ratio (false acceptance ratio and false rejection ratio) is evaluated only by the likelihood in this invention, instead of considering the registered person appearance frequency and the non-registered person appearance frequency. In short, the false acceptance ratio (FAR) and the false rejection ratio (FRR) are expressed respectively by Expression (3) and Expression (4).

$$FRR(x) = \Sigma\{x < xi < 1\} P(xi|G) \quad (3)$$

$$FAR(x) = \Sigma\{0 < xi < x\} P(xi|I) \quad (4)$$

Figure 4:
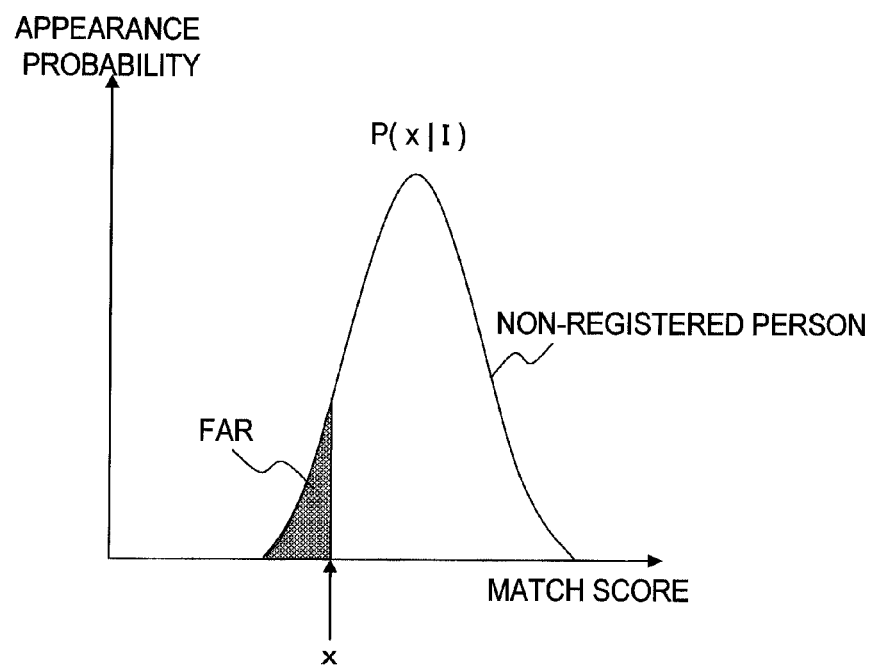
FIG. 4 is a graph illustrating how the false acceptance ratio (FAR) is calculated from the match score appearance frequency probability.

FIG. 4 is a graph illustrating how the false acceptance ratio (FAR) is calculated from the match score appearance frequency probability.

A value x is observed in the non-registered person match score probability distribution $P(x|I)$. The false acceptance ratio in the case where the result thereof indicates a registered person is expressed by the area of the cross-hatched region. The above Expression (3) of $FAR(x)$ is thus derived. In the case where a registered person distribution that has a high reliability is obtained, FAR and FRR can be calculated with the use of Bayesian probability in the manner described above.

Next, the match score appearance probability distribution described above is used to examine the erroneous recognition ratio in matching of reduced data against reduced data in a 1:N authentication system.

The false rejection ratio and the false acceptance ratio can be calculated by the following Expressions (5) and (6). When there are N pieces of registered data, the risk of false acceptance is substantially N times greater. Accordingly, in order to achieve as low a false acceptance ratio as that of 1:1 authentication in 1:N authentication, a value obtained by multiplying the false acceptance ratio in 1:1 authentication by 1/N is set as the false acceptance ratio of 1:N authentication. It can therefore be determined that an allowable false acceptance ratio $FAR_n$ set to the system is satisfied when an x that satisfies Expression (5) appears.

$$FAR_n \geq n \times FAR(x) \quad (5)$$

The authentication threshold Th that satisfies Expression (5) is accordingly calculated with the use of the match score x at which this expression is an equality. In other words, the authentication threshold Th is calculated by Expression (6).

$$Th = \arg\_x\{FAR_n = n \times FAR(x)\} \quad (6)$$

The function $\arg\_x\{Y\}$ is a function that returns x that makes Y true. In the case where authentication is determined as a success at the time a match score that meets the threshold Th is obtained, the predetermined $FAR_n$ which has been set as system specifications is satisfied and the reliability is maintained.

An authentication threshold determined in the manner described above is used to execute matching in order. As a result of checking reduced data against reduced data of registered data, the match score x that meets the ratio $FAR_n$ determined in the manner described above is obtained. In this case, matching against registered data is stopped, and this user is identified as the relevant registered person (S306), which completes the authentication. The input data may be checked against normal-size registered data of the registered person in question for reconfirmation, so that the user is identified as the registered person with higher certainty. This enhances the reliability of identification result even more. When the user is rejected by the matching that uses normal-size data, the result of matching of reduced data is determined as an error and matching is resumed to check against the remaining registered data.

In this manner, matching against all pieces of reduced data is repeated until a match score that is lower than the authentication threshold appears. However, depending on the relation between the non-registered person appearance probability distribution and the set $FAR_n$, none of obtained match scores may meet $FAR_n$. In such cases, this matching processing does not yield a definitive authentication result, but the result of this matching processing is used to rearrange data for matching on the next data size layer.

During the repeated processing, the user's waiting time may exceed a practical length of time. An allowable timeout period is therefore set and the matching processing is terminated at the time the set timeout period expires (S307).

In the case where a match score that meets $FAR_n$ is not obtained after checking against all pieces of registered data, the matching processing is continued with the use of normal-size data. Prior to the matching processing that uses normal-size data, the processing order of the registered data is rearranged in accordance with the above matching result (i.e., in ascending order of match score) (S309). Reduced data contains the feature amount of original matching data, and hence the similarity of matching data is high between pieces of biometric information of the same individual, and is low between pieces of biometric information of different individuals.

This means that, in the case where the authentication subject is registered, rearranging registered data in the order of similarity and then executing matching processing of the next layer is likely to put registered data of this authentication subject in an earlier place in the order. Therefore, the input data is checked against the authentication subject's own registered data at an early stage in the matching that uses normal-size data, and hence a match score that meets $FAR_n$ is detected at an early stage. The authentication is thus finished early and the speed of authentication processing is enhanced.

While matching processing in this embodiment is executed on two layers including reduced data of one reduced size and matching data of one normal size, three layers or more may be provided in order to achieve an objective speed and precision. In that case, matching is executed in order from layers of smaller data sizes.

The flow of matching using normal-size data is substantially the same as that of matching using reduced data. First, the variable n for identifying a piece of registered data is initialized to 1 (S310), and then the input data is checked against the registered data represented by the variable n to calculate a match score (S311). The registered person match score appearance probability distribution of normal data and the non-registered person match score appearance probability distribution of normal data are referred to in order to determine whether or not the match score is lower than an authentication threshold Th2 at which the predetermined FARn is obtained in matching of normal data (S312).

When it is determined as a result that the match score is lower than the authentication threshold Th2, the matching is determined as a success (S313) and the authentication is ended. When the match score is equal to or higher than the authentication threshold Th2, on the other hand, 1 is added to n (S315) in order to check against the next piece of registered data and processing from S311 on is repeated as many times as the number of pieces of registered data.

Monitoring for a timeout is also executed as described above (S314) and, when a given timeout period expires, the authentication is determined as a failure and the authentication processing is ended. The counting of the timeout period begins at the time the user presents a living body, and it is determined that a timeout has occurred at the expiration of a length of time in which a user is allowed to wait for an authentication result (for example, one second) since the start of the counting. Setting a timeout in this manner ensures that an authentication result is obtained within a given period of time.

In particular, in the situation where authentication fails such as when a non-registered person presents a living body, when a registered person presents non-registered biometric information (for example, finger veins of a finger different from the registered finger) by mistake, and when a living body presented is far off from the correct site, unless a timeout is set, the authentication processing is not ended till the user is checked against all pieces of registered data and the next user is kept from using the authentication device for a long period of time. Setting a timeout prevents the authentication processing from stretching on for a long time.

As has been described, matching data is provided in a plurality of sizes to constitute multiple layers, matching is executed in order from matching data of layers where the data size is smaller, the matching result of each layer is used to rearrange matching data of the next layer in descending order of similarity, and the rearranged matching data is used in the subsequent matching. This makes a quick detection of a registered person possible while maintaining a given level of authentication precision, and fast and precise authentication is thus accomplished.

Figure 5:
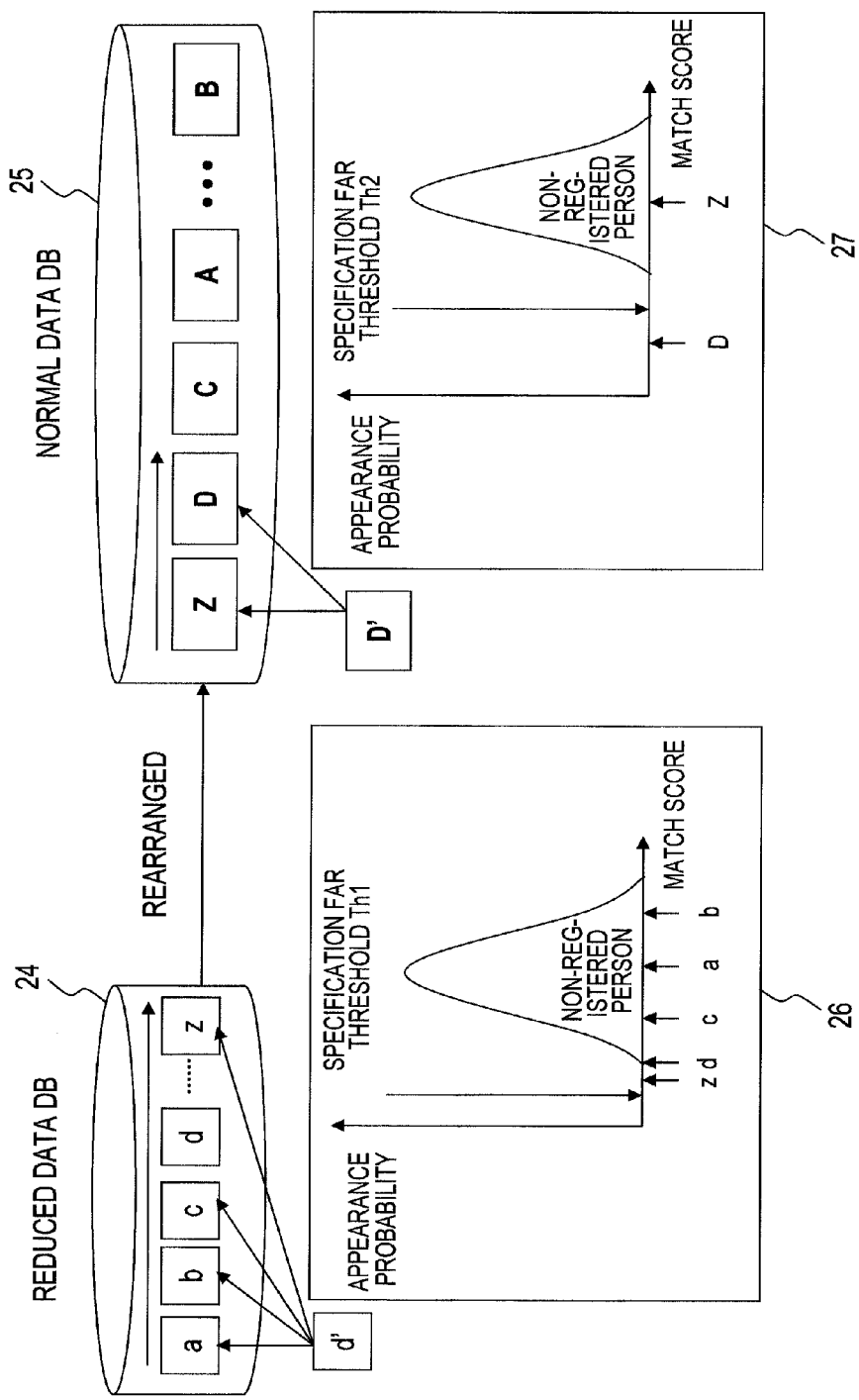
FIG. 5 is a diagram illustrating an operation of the biometric authentication system according to the first embodiment.

FIG. 5 is a diagram illustrating the operation of the biometric authentication system according to the first embodiment, and illustrates an example of improving speed by way of rearranging processing.

The 1:N biometric authentication system holds registered data A to registered data Z, and holds reduced data a to reduced data z which correspond to the registered data. Reduced data of input data is checked first against reduced data of registered data. For example, when input data d' is checked against all pieces of registered data, the resultant match scores of the pieces of reduced data are as illustrated in the appearance probability 26, and the pieces of reduced data sorted in ascending order of match score are as follows: z, d, c .... The result shows that the match scores are not lower than the authentication threshold Th1. The authentication is therefore not finished and the pieces of registered data (normal data) are rearranged by match score. The normal data of the input data is then checked against the normal data of the registered data.

The match score with respect to Z, which is in the first place in the rearranged order, exceeds the authentication threshold Th2, and the authentication is therefore a failure. The match score with respect to the next in order, D, on the other hand, is lower than the authentication threshold Th2. It is therefore determined that authenticating this data does not cause the false acceptance ratio to exceed the predetermined level. Accordingly, the user is identified as a registered person D and the authentication is finished at this point. A given level of authentication precision is maintained in this manner. Further, the authentication is quick because matching against other pieces of normal-size registered data than Z and D is omitted. High precision and high speed are thus both accomplished.

In a case where a timeout occurs during matching processing, or in a case where registered data that meets the predetermined FARn is not detected through matching processing that is completed before a timeout occurs, input biometric information cannot be authenticated. In this case, the user is informed of the fact that the user could not be authenticated via the display, a lamp, and/or the speaker, and is prompted to input next biometric information if necessary. In the case of a finger vein authentication device, for example, the user is prompted to input another registered finger. In the case where a plurality of types of biometric authentication devices are set up, the user is prompted to input a living body that is not finger veins. When requested to present a plurality of different living bodies, the user may be allowed to determine freely the order in which different living bodies are presented.

After the user presents a living body, the device needs a short period of time to complete photographing the living body. Therefore, in the case where a part of matching processing is left unexecuted because a timeout has stopped the device from completing authentication, the matching processing may be executed in parallel to the photographing processing until the photographing processing is completed. In this case, pieces of registered data are rearranged based on the result of the processing that has been executed by the time the photographing is completed, within the extent of the progress made. This way, matching of as many pieces of data as possible is executed and more effective rearrangement is accomplished for matching of the next biometric information. In the case where the continued matching processing produces a matching result that meets the predetermined FARn, photographing is terminated immediately and the user is notified of the success of authentication.

Figure 6:
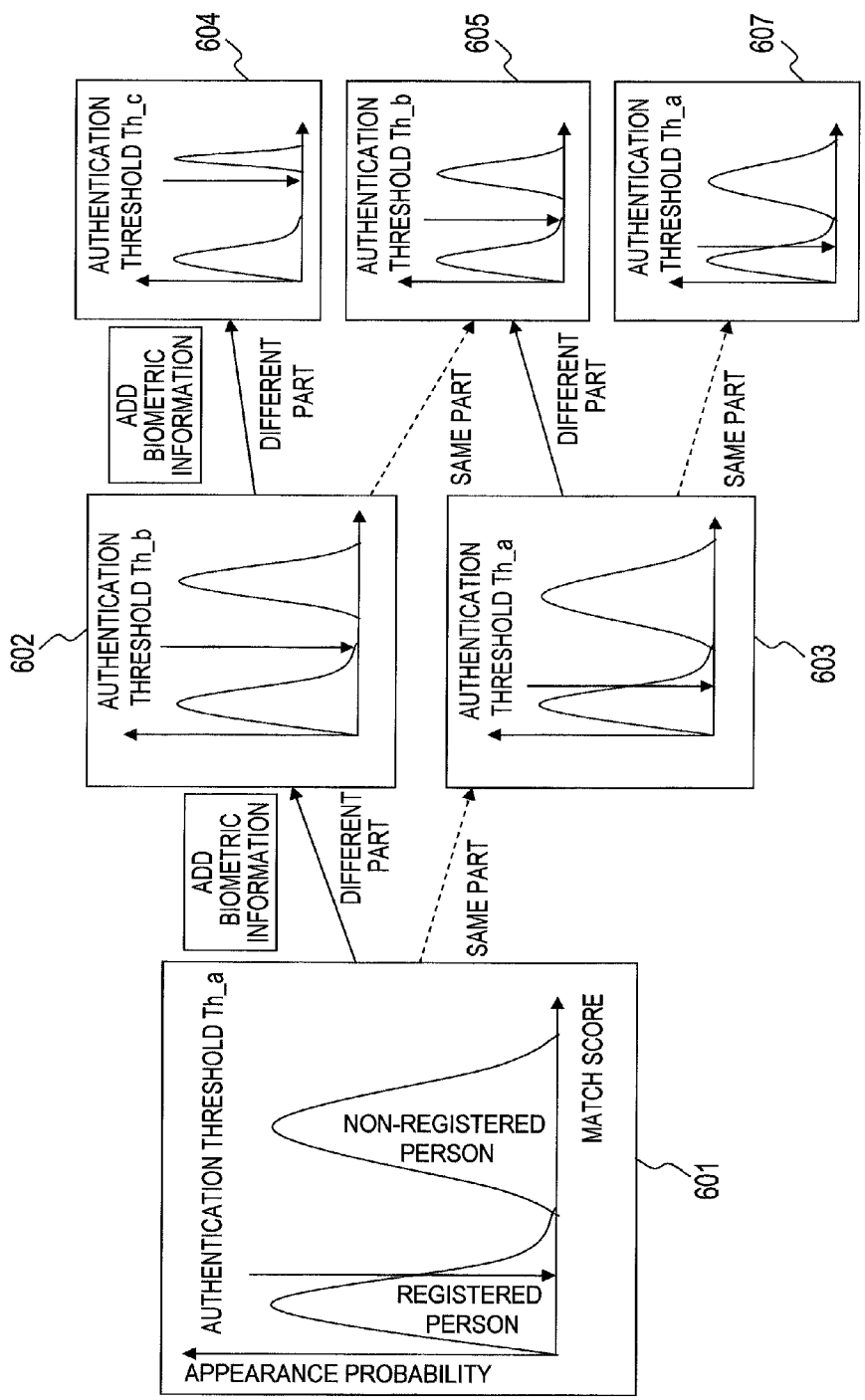
FIG. 6 is a diagram illustrating an example of how authentication results are combined when authentication uses a plurality of living bodies according to the first embodiment.

FIG. 6 illustrates an example of how authentication results are combined when authentication uses a plurality of living bodies in the first embodiment. This embodiment takes as an example the case where finger veins of a plurality of fingers are input.

A distribution 601 shows the appearance probability of the match score scored when first-finger veins are presented. For a simpler description, only the distribution of matching result with respect to normal data, which is unreduced data, is shown. In the case where a matching result that is lower than an authentication threshold Th_a set for this distribution is not obtained, the user is prompted to present second-finger veins as described above. The match score of the presented second-finger veins is then obtained in the same manner.

Generally speaking, the authentication threshold in false acceptance ratio calculation for multidimensional match score is multidimensional and cannot be determined uniquely without a registered person distribution. This threshold is also generally non-linear and constitutes a complex border in general. Such a border value can be determined by collecting a lot of reliable measurement data and spending a large calculation cost. Common recognition technologies such as Bayesian probability calculation and optimization by a support vector machine (SVM) can be used to calculate the false acceptance ratio from a multidimensional match score distribution. The first embodiment, however, employs a more viable method in which the false acceptance ratio is calculated after degenerating a plurality of match scores to one dimension so that a region where the match score is smaller than the threshold can uniquely be determined as illustrated in FIG. 4. A case where an average value of the match score of a first living body and the match score of a second living body is set as the combined match score of the first and second living bodies is described as an example of the method. The average value calculated may be an average of the weighted match scores of the first and second living bodies.

In the case where the match score of each layer is weighted, the weight can be determined through optimization by a common method such as principal component analysis.

When a non-registered person attempts authentication with the first-finger veins, a low match score may be obtained by accident but it is unlikely that the second-finger veins produce a low match score as well. For that reason, an average value of the match score of the first-finger veins and the match score of the second-finger veins is slightly lower than the average value of all non-registered persons in many cases. In the case of a registered person, on the other hand, the possibility is strong that the match score of the first living body and the match score of the second living body are both low, and an average value of the match score of the first living body and the match score of the second living body is accordingly low. Therefore, as shown in a distribution 602, the distance between the registered person distribution and the non-registered person distribution is greater when the distributions are of average values of the match score of the first living body and the match score of the second living body than when only the first living body is used. An authentication threshold Th_b for guaranteeing the predetermined false acceptance ratio in this case shifts to a point further away from the registered person distribution. Accordingly, when match scores of finger veins of two different fingers are combined (602), a person is more likely to be authenticated correctly than when finger veins of one finger are used (601).

Similarly, in the case where authentication with the second living body fails, the user is requested to present a third living body and an average value of the match scores of the first living body to the third living body is obtained. If a non-registered person happens to score low match scores with the first and second living bodies, the probability that the third living body produces a low score is even lower, and the registered person distribution and the non-registered person distribution are further apart from each other. Therefore, as shown in a distribution 604, an authentication threshold Th_c is at a point further away from the registered person distribution, and the probability is high that a registered person who has difficulties in being authenticated is correctly authenticated. In other words, the threshold rises as the number of living bodies presented increases.

However, this does not apply to the case where a user presents the same finger repeatedly. When a non-registered person happens to score a low match score by inputting the first-finger veins and presents the same finger again, second match score of the first-finger veins takes as small a value as the match score of the first-finger veins. Therefore, when the authentication threshold is relaxed to suit the presentation count as shown in the distributions 602 and 604, presenting the same finger repeatedly raises the threshold and repeating this cycle makes the total match score of the non-registered person lower than the authentication threshold. Consequently, when the same finger is presented, the distributions cannot be updated in the manner described above.

When a user presents a plurality of different living bodies, presenting the living bodies in an arbitrary order is more convenient for the user than being told which living body is to be presented in what order. Presenting again biometric information that has previously been presented is included in this case. To allow a user to present again biometric information that has previously been presented, for example, to present finger veins of the same finger a plurality of times, the first embodiment solves this problem by using the following combining method.

Each time a living body is presented, round robin matching is executed to check against all living bodies that the user in question has presented. When the resultant match score has a value lower than a specific threshold, for example, the authentication threshold Th_a described above, the two living bodies are identified as the same living body. As a result, how many of the input fingers are different fingers is obtained and a probability distribution that is relevant to the actual number of different fingers can be used. For example, in the case where two inputs out of three requested inputs have the same pattern, it means that two types of living bodies have been input, and a probability distribution for the case where different fingers are presented twice in total is used. Specifically, a distribution 605 is to be used. In this manner, the probability distribution is updated to suit the number of types of living bodies. A distribution 603 is a probability distribution that is used when the second finger and the first finger are identified as the same finger, and is the same as the distribution 601 that has been used for the first finger. When the third finger is presented, the distribution used is similarly switched to one suitable for the number of fingers that have been presented. In this manner, unnecessary relaxation of the authentication threshold due to repeated presentation of the same finger is prevented and the reliability of the authentication system is maintained.

Figure 7:
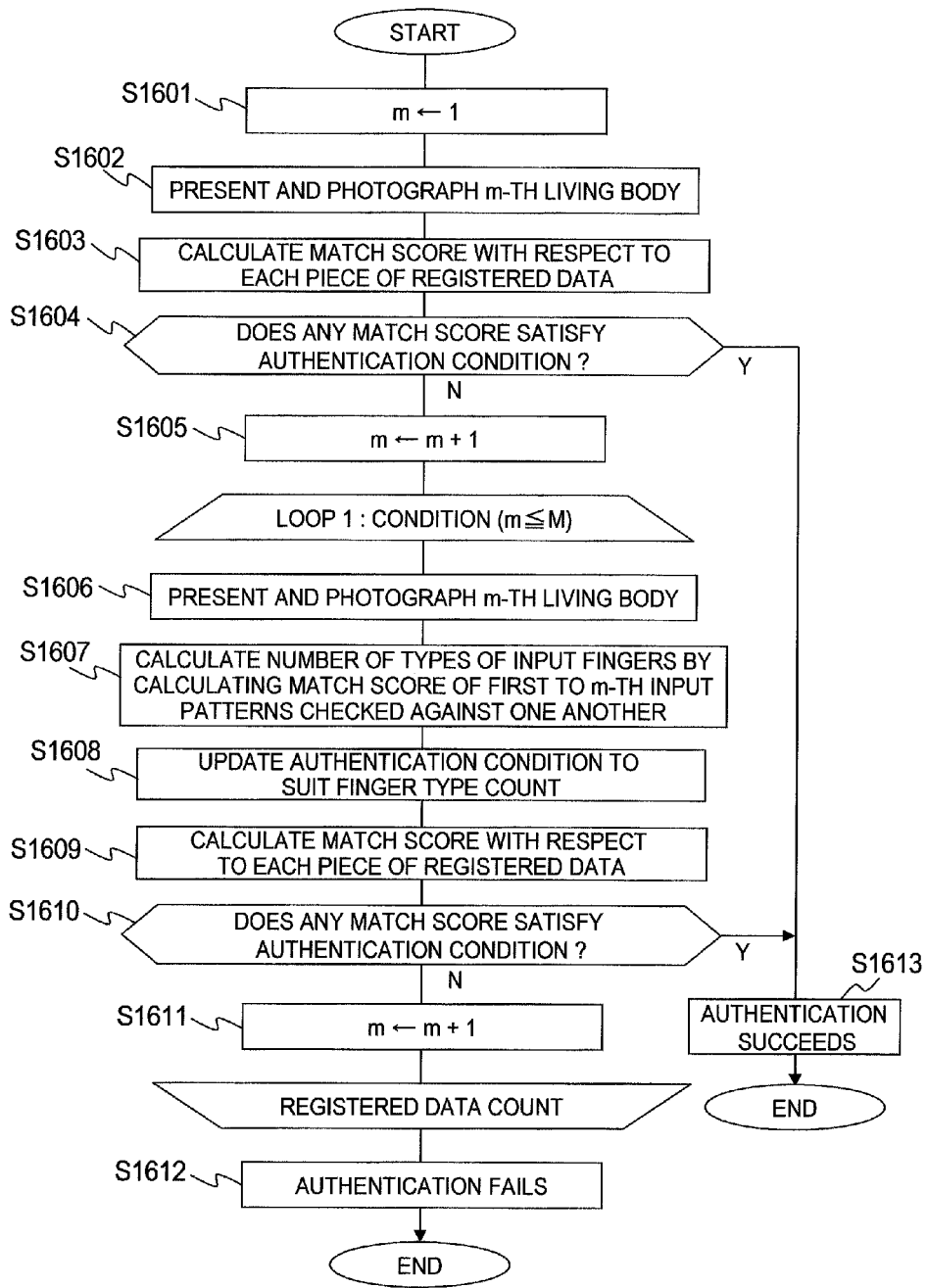
FIG. 7 is a flow chart illustrating an example of a processing for updating an authentication threshold according to the first embodiment.

FIG. 7 is a flow chart illustrating an example of the processing described with reference to FIG. 6 in which the number of types of living bodies presented is counted to update the probability distribution and the authentication threshold. Described here is a case where input living bodies are finger veins.

First, a living body (finger) presentation count m is initialized to 1 (S1601). Next, when the user presents a first finger (S1602), the authentication system calculates a match score with respect to each piece of registered data as described above (S1603).

The authentication system then determines whether or not the calculated match score satisfies a condition for successful authentication (i.e., registered data of high similarity that meets the upper FAR limit set to the system is detected and a timeout does not occur in the process of matching) (S1604). When it is determined as a result that the match score satisfies the condition, the authentication is deemed as a success (S1613) and the authentication processing is ended. When the match score does not satisfy the condition, on the other hand, the user is prompted to present a finger again.

The finger presentation count m is increased by 1 (S1605). The user presents an arbitrary second finger which differs from the previously presented first finger (S1606). The match score of matching between the finger vein patterns that have been input so far is calculated next to obtain the number of fingers presented (S1607). The first time this calculation is executed, the vein pattern of the first finger and the vein pattern of the second finger are checked against each other. The similarity between these two finger vein patterns is then determined. When it is determined as a result that the similarity is lower than a given threshold, the two presented fingers are identified as the same finger and, when the similarity exceeds the threshold, the two fingers are determined as different fingers. The number of types of fingers presented is obtained in this manner. The given threshold is set to, for example, a similarity at which the false acceptance ratio is 1/1,000,000.

Thereafter, the successful authentication condition for the result of authentication that uses a plurality of presented fingers is updated to suit the finger type count (S1608). Specifically, the match score appearance probability distribution and the authentication threshold are updated for authentication that uses the first finger and the second finger both. The match score of the first finger and the match score of the second finger are then calculated and combined to execute authentication processing (S1609). The match scores are combined by the methods described above which include a method that uses an average value of the match scores and a method that treats the match scores as a multidimensional vector.

The authentication system then determines whether or not the authentication condition is satisfied as in S1604 (S1610). When it is determined as a result that the match score satisfies the condition, the authentication is deemed as a success (S1613) and the authentication processing is ended. When the match score does not satisfy the condition, on the other hand, the finger presentation count m is further increased by 1 (S1611) to repeat S1606 and subsequent processing. In the case where the processing is repeated until the finger presentation count m reaches a maximum value M, the authentication system exits the loop, determines the authentication as a failure, and ends the processing (S1612).

The match score appearance probability distribution of matching between non-registered persons described above can be evaluated in advance. However, advance evaluation requires collecting evaluation data, which is laborious, and is also limited in collection scale. Using matching results that are produced when the system is actually in operation provides a probability distribution that is large in scale and high in reliability.

A mode of carrying out the method in which the probability distribution is updated when the system is in operation is described below. The system holds, as initial data, a match score appearance frequency distribution that is obtained by an evaluation executed before the system is put into operation. At the time the system starts running, pieces of data are registered in order and these pieces of data are used to calculate the match score of matching between different persons and update the match score appearance frequency distribution. In the case where a rule that prohibits multiple registrations of the same individual is set, it is guaranteed that each piece of registered data is different biometric information, and the probability distribution is updated at an accordingly high level of reliability.

In the case of a living body presented by a user for authentication, whether the use is a registered person or a non-registered person is unknown at the time the living body is presented. Authentication processing is therefore actually executed to determine that the results of matching of input data against all pieces of registered data, except one result that is unlikely to be of a different person, as matching results of other persons, and the frequency distribution is updated accordingly. When it is determined that the input data cannot be authenticated, the frequency distribution is not updated because whether it is a case of false rejection of a registered person or a case of a non-registered person cannot be determined. Through use of only matching results of high reliability in this manner, a probability table can be updated and a more accurate error ratio is calculated. The probability table is constituted specifically of a list in which the match score of matching between different living bodies is paired with an appearance count.

Finger veins of different fingers have been described as an example of the plurality of pieces of biometric information in the first embodiment. Other biometric features that can be used include a fingerprint, wrinkles in a finger joint, a face, an iris, an ear, a retina, and lips. When authentication that uses these features fails and the presentation of further biometric information is required, presenting biometric information about these features may be requested or, in the case of living bodies that can be photographed in a single action, a plurality of living body parts may be photographed at once to simplify the operation of the authentication subject. For example, finger veins and a fingerprint may be photographed with the same device at the same time. To give another example, finger veins and the face may be photographed simultaneously by setting up a camera for photographing the face in front of a terminal that photographs finger veins.

In the case of photographing finger veins, in particular, a finger presented by the user may be rotated along the central axis of the finger to present veins on a side or rear of the finger so that images photographed from multiple directions are used as a plurality of pieces of biometric information. Alternatively, various sites of a finger may be photographed in succession by shifting the presented site of the finger along the central axis of the finger. Thus, methods of presenting different sites of one finger have such advantages as simple and quick operation and requiring no alteration to a normal finger vein authentication device.

Instead of presenting only a plurality of pieces of biometric information, an input of non-biometric information for identifying an individual, such as PIN, may be used in combination with biometric information. The ratio of compound errors resulting from these pieces of information can be calculated the same way as in the above-described case where a plurality of pieces of biometric information are used, by combining the error ratio related to biometric information and the error ratio related to non-biometric information.

In the error ratio related to an input PIN, in particular, the false acceptance ratio fluctuates depending on the number of digits to be input. Determining the number of PIN digits to be input in accordance with the error ratio related to the first living body therefore guarantees a predetermined false acceptance ratio and saves the trouble of inputting. For example, when the false acceptance ratio is 0.005% in authentication that uses the match score of biometric information alone and the objective false acceptance ratio is 0.001%, it is sufficient if the false acceptance ratio is reduced by at least ⅕ by inputting a PIN. Accordingly, one digit of a PIN is input and whether or not the input PIN matches a registered PIN. In the case where a living body error and a PIN error occur independently of each other, the combined false acceptance ratio is expressed by the product of the two. In short, the false acceptance ratio for one digit of a PIN is 10% and the combined false acceptance ratio which combines the living body error ratio and the PIN error ratio is 0.0005%. The objective precision is thus accomplished. Even when registered PINs are eight-digit figures, merely inputting the first digit leads to successful authentication and improves the convenience.

Authentication succeeds when inputting one digit of a PIN is repeated ten times. As a countermeasure to an attack from a non-registered person, the input repetition count may be raised during an attack by setting the minimum number of digits to be input to, for example, three digits even though the objective precision is accomplished stochastically.

By obtaining a probability distribution in advance for the PIN input error ratio, authentication succeeds despite an error in an input PIN when the predetermined false acceptance ratio is met. For example, when a true PIN set by a user in advance is "1234" and the user inputs a wrong PIN that differs in one digit, such as "2234", a false acceptance ratio for tolerating this error is 40/10,000. In the case where a result of combining this PIN-related false acceptance ratio and the living body-related false acceptance ratio meets the predetermined error ratio, authentication succeeds despite an error in an input. Specifically, when a biometric authentication error and a PIN input error occur independently of each other, the combined error ratio can be obtained by simply calculating the product of the error ratios.

Using a PIN and biometric information in combination thus allows a user who has input a wrong figure as a part of the PIN to be authenticated successfully, and enhances the convenience while maintaining a given level of precision. Strictly speaking, the probability of accidentally pressing the "2" key in place of the "1" key differs from the probability of accidentally pressing the "9" key in place of the "1" key. These probabilities of pressing a wrong key may be taken into account when obtaining a probability distribution. This way, the probability can be calculated in more detail.

The system may suggest a living body to be input next to the user to reduce the number of pieces of registered data to check against which is otherwise large. For example, with an authentication system in which finger veins of a plurality of fingers are registered, it is highly convenient if the operation of presenting fingers of the user's choice in an unrestricted manner is provided. However, because the system needs to execute matching processing against all pieces of registered finger data, the processing speed and precision deteriorate as the number of pieces of data to check against increases. On the other hand, when the system instructs the user to present, for example, "the middle finger of the right hand", the user only needs to be checked against data registered as the middle finger of the right hand, and the matching speed and the authentication precision are accordingly improved.

Similarly, the user may input to the system the type of a living body presented. Alternatively, a user who registers a plurality of living bodies may determine in advance an order in which the living bodies are presented at the time of authentication so that authentication succeeds when the living bodies are presented in the determined order. In this case, a cross-checking order is attached to a plurality of pieces of registered data of each person, and the pieces of registered data are matched in the attached order at the time of authentication. This enables the system to quickly narrow down data without explicitly specifying living bodies to be input. Moreover, if the input order varies from individual to individual, the safety is improved even more.

The method executed by the procedures of the first embodiment, namely, the method in which pieces of matching data are rearranged and an authentication result is established at the time a match score that meets the predetermined FARn is obtained, is possibly vulnerable to defects of some biometric authentication technologies. This is because an input of so-called wolf data, which has high similarity with a plurality of or all pieces of registered data, cannot be detected. This invention is capable of detecting wolf data by using a timeout period.

Wolf data, which has high similarity with a plurality of pieces of registered data, is likely to have high similarity also when matched as reduced data. Therefore, even after a match score that meets the predetermined FARn is obtained, matching is continued following the order in which pieces of registered data are arranged. The matching is stopped at the expiration of the timeout period. Matching results obtained so far are examined to confirm that match scores with respect to a plurality of pieces of registered data do not meet the predetermined FARn. Although checking against all pieces of registered data is difficult in terms of matching time, because the pieces of registered data are rearranged in accordance with the result of matching that uses reduced data, it is likely that a plurality of pieces of registered data having high similarity appear at the head if wolf data has been input. Therefore, by checking some pieces of rearranged registered data at the head, the fact of a plurality of match scores meeting the predetermined FARn can be determined at high probability, and the fact that input data is wolf data is detected within a given period of time with high precision.

Second Embodiment

Figures 8A, 8B:
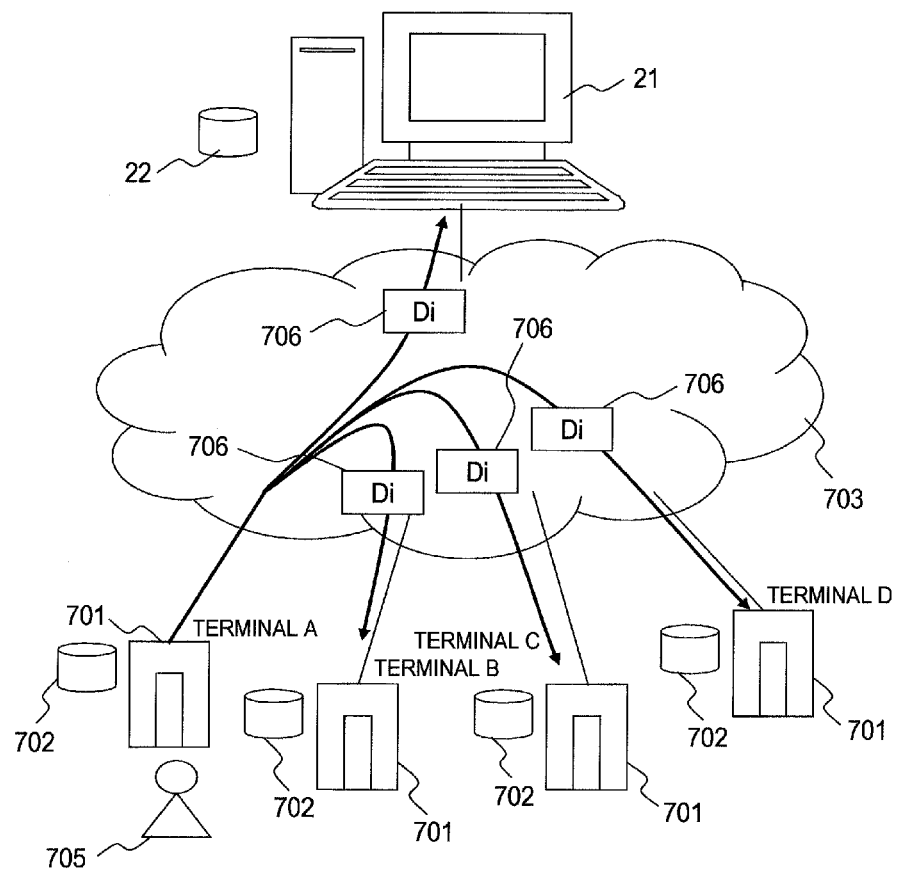
FIG. 8A is a diagram illustrating an overall configuration of a biometric authentication system according to a second embodiment.
FIG. 8B is a diagram illustrating an example of a registered data list according to the second embodiment.

FIG. 8A illustrates a configuration example of an authentication system according to a second embodiment of this invention.

The authentication system of the second embodiment speeds up authentication processing by utilizing many authentication terminals that are disposed on a network in a dispersed manner. The biometric authentication system of the second embodiment includes one server 21, one registration database 22, which holds all pieces of registered data, a plurality of authentication terminals 701, and a network 703. The server 21 and the terminals 701 are coupled to each other via the network 703. Each terminal 701 photographs a living body of a user to perform personal authentication and, in addition, handles processing that follows authentication, such as controlling a door key as an entrance/exit management device. Each terminal 701 is what is called a self-contained authentication device, and includes a storage device 702 (e.g., a volatile or non-volatile memory or a magnetic disk) for storing registered data against which input data is checked, a processing device that executes authentication processing, and a function of executing post-authentication processing. The network 703 is a common wired or wireless LAN or, in the case where the authentication terminals are portable terminals having a cellular phone function, a cellular phone network.

Each terminal 701 holds a plurality of pieces of registered data and can execute 1:N authentication by itself within the extent of the held registered data.

The number of pieces of registered data held in each terminal 701 is limited not only by the capacity of the storage device installed in the terminal, but also by the relation between a response time that is allowable as an authentication device and the processing speed. The terminals are generally lower in processing power than the server, and the number of registered persons may increase beyond the data recording capacity of the terminals. It is therefore difficult for a single terminal to execute large-scale 1:N authentication by itself. Accordingly, the terminals each hold a part of the entirety of registered data and authentication processing is executed mainly by the server having superior processing power. Each terminal 701 holds a registered person ID list 704 (FIG. 8B), which shows which terminal holds which registered data. By referring to the registered person ID list 704, each terminal 701 can know which registered data is held in the terminal 701. This list is updated with latest information each time a piece of registered data is added.

When matching processing requests processed by one server 21 increase due to the addition of a new terminal 701 after the system is put into operation, or due to an increase in number of registered persons, the waiting time of matching processing is prolonged. Dealing with this by adding a server or upgrading to a server that has higher processing power requires a large cost. This invention solves the problem of prolonged matching processing by commissioning an idle terminal which is not executing authentication processing at the moment to perform a part of matching processing, and thereby executing authentication processing in parallel.

A detailed description is given on a configuration of this invention, taking as an example a situation in which the total number of pieces of registered data is 10,000, the number of pieces of registered data that each terminal can hold is 2,000, and a user 705 uses a terminal A.

The terminal A first makes an inquiry to each of the other terminals 701 about the running state of the terminal. Receiving the inquiry about the running state, each terminal 701 returns a message to the fact that the terminal 701 is running in the case where the terminal 701 is in a photographing state or a matching processing state, and otherwise returns a message to the fact that the terminal 701 is in an idle state. Notifying a length of time for which the idle state has lasted and the operating rate of the terminal as additional information to the message is recommended. The operating rate used may be, for example, an average operating rate for a 24-hour period. Next, the registered data list 704 managed by an idle terminal is referred to in order to determine, for each idle terminal, registered data that the idle terminal is to be commissioned to match.

An example is given of how registered data to be commissioned is determined. While each terminal holds 2,000 pieces of registered data which are a part of the whole, results of matching against all pieces of registered data are needed and a plurality of terminals are therefore used. In the case of a piece of registered data that is held in only one of all idle terminals, the terminal holding this piece of registered data is commissioned to match the piece of registered data. In the case where the same registered data is held in a plurality of terminals, the matching of the registered data is allocated in a manner that evens out the number of pieces of data commissioned for matching among the terminals. In the case where the terminals have a substantially equal number of pieces of commissioned data, more pieces of data are allocated for matching to a terminal that has a low operating rate. A terminal low in operating rate is unlikely to have a visitor during matching processing, and allocating more pieces of data for matching to this terminal means that matching processing can be executed uninterruptedly. The operating rate calculated is a short-term operating rate or a long-term operating rate. For example, when it is a long-term operating rate that is calculated, a terminal that has been in an idle state for a long time has a low operating rate. In the case where the terminals have a substantially equal operating rate, a terminal is selected at random (or round-robin) and matching that uses the other pieces of registered data (pieces of registered data that are not held in the terminal) is executed by the server 21.

For example, when there are 10,000 pieces of registered data identified by 0000 to 9999 and the terminals A, B, C, and D are in an idle state at the time the terminal A receives an input from the user 705, the terminal A holds pieces of registered data that have IDs 0000 to 1999, the terminal B holds pieces of registered data that have IDs 1000 to 2999, and the terminals C and D each hold pieces of registered data that have IDs 4000 to 5999 as shown on the registered person ID list 704 (FIG. 8B). The pieces of registered data having IDs 0000 to 0999 are held only in the terminal A, and the terminal A therefore handles matching against the pieces of registered data having IDs 0000 to 0999. The pieces of registered data having IDs 1000 to 1999 are managed by the terminal A and the terminal B both, and both terminals can execute matching processing of these pieces of registered data. However, the terminal A is planned to perform matching processing of 1,000 pieces of data, and the terminal B is therefore commissioned to execute matching against the pieces of registered data having IDs 1000 to 1999. The pieces of registered data having IDs 4000 to 5999 are held in the terminals C and D both. If the ratio of the operating rate of the terminal C and the operating rate of the terminal D is 3:1, the numbers of pieces of data allocated to the terminals C and D are reciprocal to this ratio. Specifically, the terminal C is assigned matching against 500 pieces of registered data having IDs 4000 to 4499, and the terminal D is assigned matching against 1,500 pieces of registered data having IDs 4500 to 5999. This way, the number of pieces of data matched by the terminal C is kept at 500, thereby enabling the terminal C to complete the processing quickly and preventing the operating rate from rising further, and the load is uniformized throughout all terminals.

None of the terminals hold the remaining pieces of registered data which are identified by 3000 to 3999 and 6000 to 9999, and the server 21 is commissioned to execute matching against these pieces of registered data. The registered data list can be reduced in size if the IDs of pieces of registered data held in the respective terminals are managed to be consecutive.

The terminal 701 that commissions matching transfers matching commission data Di 706 to the commissioned terminal 701 or the commissioned server 21. The matching commission data includes a list of registered person IDs to be matched, input data for matching of a presented living body, a match score threshold, and a timeout period. The commissioned terminal 701 checks the input data against IDs from the list of registered person IDs to be matched. Each terminal 701 may configure feature data having a plurality of sizes into multiple layers in order to employ the speed improvement method described in the first embodiment which involves rearranging pieces of registered data and terminating authentication at the time a result lower than an authentication threshold is obtained.

When matching against all pieces of registered data is finished or when a timeout occurs, match scores which are results of the matching are returned to the terminal A which has requested the commission. Receiving the matching results (match scores), the terminal A which has requested the commission authenticates the user 705 as soon as one successful authentication result is obtained, without waiting for matching results from other terminals. In the case where a match score that is lower than the authentication threshold is not obtained even after all matching results are provided, the terminal A prompts the user to present the next living body, or deems the authentication as a failure and ends the authentication.

The response time is thus shortened by executing matching processing in parallel while evening out the load among the terminals.

In the case where a terminal is commissioned to execute matching and a user presents a living body to the terminal immediately thereafter, the terminal may execute living body photographing processing first. This reduces the waiting time of the user of the terminal commissioned to execute matching. It is recommended to notify the terminal that has requested the commission of the occurrence of interrupting processing at that point. Notified of the occurrence of interrupting processing, the terminal that has requested the commission may commission another idle terminal 701 or the server 21 for authentication processing.

In the embodiment described above, the terminal A to which a living body has been presented for authentication determines the terminal 701 that executes matching processing. Instead, the server 21 may determine which terminal 701 is to execute matching processing. The server 21 in this case holds the registered person ID list 704. The terminal A transmits input data to the server 21, and the server 21 refers to the registered person ID list 704 to determine the terminal 701 that executes matching processing, and transfers the input data to the determined terminal 701. Alternatively, the server 21 may only determine how the matching processing assignment is shared and notify the determined assignment to the terminal A, which then transmits input data to each relevant terminal 701.

In the embodiment described above, the terminal 701 to which a living body to be matched has been presented commissions each idle terminal 701 directly to execute matching. In an alternative mode, the terminal 701 to which a living body has been presented may transmit input data and a commission list to the server 21, and each idle terminal 701 may periodically check the server's commission list and, when the idle terminal 701 can handle matching processing, receives the input data from the server 21 to execute authentication processing and return results of the authentication processing to the server. The terminal that has requested the commission waits until all pieces of commissioned data have been matched, and determines whether authentication is a success or a failure at the time matching of all those pieces of data is completed. Thus, when it is the server 21 that commissions matching, the system can make use of an otherwise wasted idle period which is generated in the case where a terminal that has been running when commissioned enters an idle state immediately thereafter. In short, this is especially effective for a situation where switching between a running state and an idle state is repeated frequently.

Third Embodiment

Figures 9A, 9B:
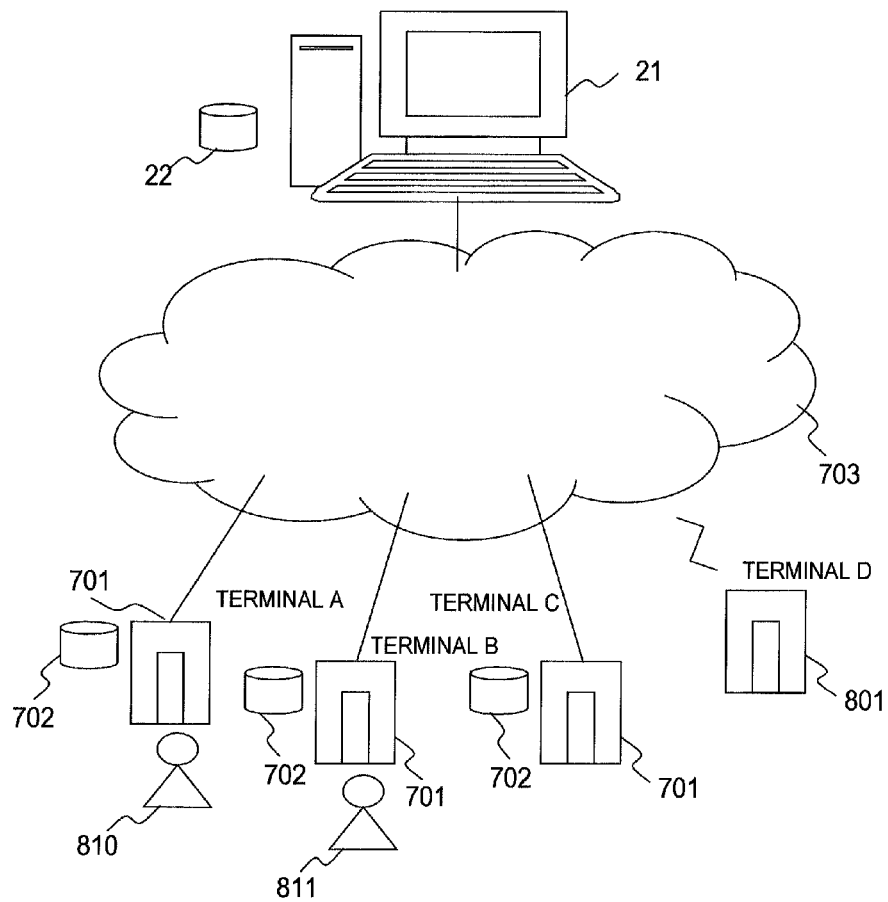
FIG. 9A is a diagram illustrating an overall configuration of a biometric authentication system according to a third embodiment.
FIG. 9B is a diagram illustrating an example of a travel time database according to the third embodiment.

FIG. 9A illustrates a configuration example of an authentication system according to a third embodiment of this invention.

The authentication system of the third embodiment narrows down registered data to check against by temporarily invalidating some pieces of registered data while a user is traveling between terminals.

The authentication system includes stationary terminals 701, which are set up in a physically fixed manner, and a mobile terminal 801, which is portable. A server 21 holds in a travel time database 803 (FIG. 9B) an estimated time necessary for a user to travel physically from the location of one stationary terminal 701 to another stationary terminal 701. The average travel time and shortest travel time necessary for a person to travel between terminals may be calculated depending on conditions such as the physical distance between the terminals and the means of travel. During a time period necessary for a user who has successfully been authenticated at one terminal to travel to another terminal, registered data of the user is excluded from matching candidates, to thereby reduce the number of pieces of registered data that are actually matched and speed up matching.

In the case where a user is carrying the mobile terminal 801, the location of the terminal is estimated from, for example, GPS or the placement of wireless LAN access points, and the estimated location information is transmitted to the server 21. The server 21 calculates a distance to another terminal based on the transmitted information.

In the case where an inter-terminal distance database is used to calculate a travel time between terminals, the travel time may be calculated by simply using the straight-line distance. When detailed information such as the means of travel is available, travel time calculation may take the travel means information (i.e., travel speed) into account. The travel speed varies depending on the means of travel, and a system administrator may set a default means of travel and a default travel speed thereof, such as traveling on foot within the same building and traveling by car between different buildings.

A concrete example of the third embodiment is described in detail with reference to FIG. 9A.

First, a registered person first sets 200 seconds as an estimated shortest time necessary to travel between terminals A and B, 300 seconds as an estimated shortest time necessary to travel between the terminal B and a terminal C, and 500 seconds as an estimated shortest time necessary to travel between the terminals A and C, taking into account the relation between terminal locations and the means of travel. A terminal D is a mobile terminal, and the calculation of the current location based on GPS reveals that the terminal D is in a place that is estimated to be 6,500 seconds, at minimum, away from the terminal A. When a mobile terminal is included, the database 803 of the estimated travel time is updated in real time.

Next, a user 810 presents a living body to the terminal A 701, the terminal A transfers input data to the server 21, and the server 21 executes authentication processing. The user 810 is successfully authenticated as a result. A fact that the user 810 has successfully been authenticated at the terminal A and a time stamp thereof (a time at which the living body has been presented or a time at which the authentication has succeeded) are recorded in the server 21. The server 21 calculates for each terminal 701 a period in which registered data of the user 810 is to be invalidated. A value written in the database 803 of the inter-terminal travel time is used as the invalid period. Specifically, 200 seconds, 500 seconds, and 6,500 seconds are set in this embodiment as invalid periods of the terminal B, the terminal C, and the terminal D, respectively.

A user 811 presents a living body to the terminal B immediately (within 200 seconds) after the user 810 is authenticated. In prior art, the user 811 in this case is checked against registered data of the user 810 as well. In this embodiment, on the other hand, it is determined that the user 810 could not have completed the travel to the terminal B because the time elapsed since the time stamp is within the time period necessary for the user 810 to travel from the terminal A to the terminal B, and registered data of the user 810 is excluded from matching targets. In this manner, the number of pieces of registered data to check against is reduced and matching is accordingly sped up. The false acceptance ratio is also lowered because the number of pieces of registered data of other people to check against is reduced. While only one piece of registered data is excluded in this embodiment, this excludes many pieces of registered data and is highly effective in a large-scale authentication system.

The travel time database 803 may be a fixed database of time periods calculated from the inter-terminal distance, or may be updated with actual measurement values by the following method:

Every time authentication succeeds, each terminal transmits to the server 21 information about the authenticated user, the terminal used, and a time at which the user has successfully been authenticated. Similar information is transmitted to the server 21 also when this user attempts to initiate authentication at another terminal after some time. The server 21 uses the information transmitted from the respective terminals to obtain a time period necessary for this user to travel between terminals. Because the travel time varies from one user to another, the travel time of, for example, a user who takes the shortest time to travel as the travel time between the terminals. Alternatively, a value obtained by multiplying the shortest travel time by a safety coefficient (for example, 0.8) may be set as the travel time in anticipation of the emergence of a user who takes an even shorter time to travel.

This provides a more practical travel time than when the travel time is determined simply by the physical distance, and thus makes it possible to narrow down registered data efficiently. Employing the travel time of a user who takes the shortest time to travel also lowers the possibility of the system determining erroneously that a user cannot complete the travel when there is actually enough time to complete the travel. The travel time database 803 may be managed for each registered person separately because a time period between the success of authentication and an attempt to initiate authentication at another terminal varies from individual to individual. This way, the travel time is managed for each individual and registered data can be narrowed down efficiently.

Instead of excluding a piece of registered data from matching targets during an invalid period of the piece of registered data, the piece of registered data may be put at the back of the cross-checking order in the registration database. This merely prolongs the matching time of a user who is unlikely to arrive and therefore lowers the possibility of false rejection.

Figure 10A:
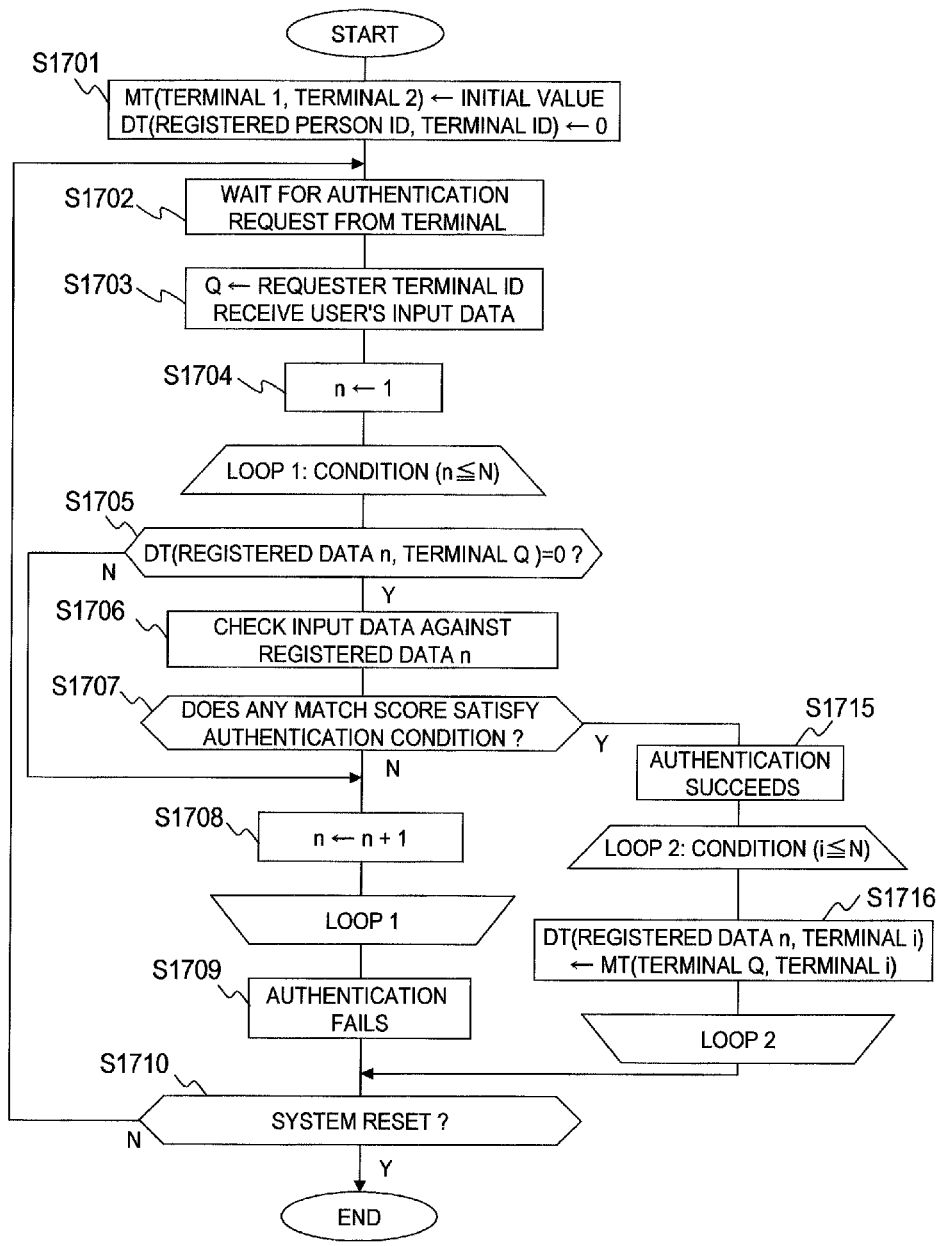
FIGS. 10A and 10B are flow charts of authentication processing according to the third embodiment.
Figure 10B:
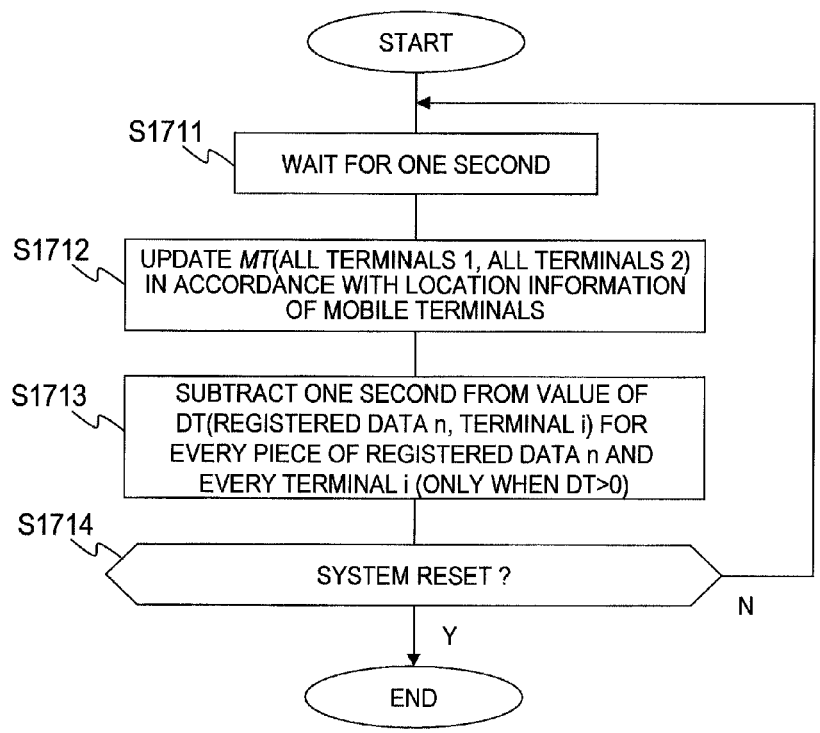

FIGS. 10A and 10B are flow charts of authentication processing according to the third embodiment.

First, the server 21 sets MT(Terminal 1, Terminal 2) stored in the travel time database 803 to an initial value, and resets to 0 every DT(registered person ID, terminal ID) value stored in a timetable for managing an invalid period for each piece of registered data (S1701). The invalid period timetable holds a time period DT(registered data X, terminal Q) in which the registered data X is invalidated with respect to an input from one terminal Q. The invalid period DT(registered data X, terminal Q) is expressed in seconds and, when the DT value is a positive value, 1 is subtracted from DT for every second elapsed (S1713). In the case where the invalid period of a piece of registered data is set to 0, it means that the piece of registered data is valid and included among matching targets.

The server 21 next waits for an authentication request from one of the terminals 701 (S1702). When an authentication request is issued, the server 21 obtains the terminal ID of the terminal 701 that has requested authentication and input data presented by the user (S1703). The server 21 next checks the input data against each piece of registered data. The variable n for specifying a registered data ID is first initialized to 1 (S1704).

A loop for matching against all pieces of registered data (S1705 to S1708) is then started. In the loop, whether or not a value in the invalid period timetable is larger than 0 is determined first (S1705). When it is determined as a result that the invalid period DT(registered data X, terminal Q) is 0, this registered data X is a matching target and the input data is therefore checked against the registered data X (S1706). When the invalid period DT(registered data X, terminal Q) is larger than 0, this registered data is invalid and therefore is skipped in matching processing.

This processing is repeatedly executed for pieces of registered data that have registered data IDs 1 to N, and the server 21 determines whether or not a match score that satisfies an authentication condition for identifying a user as a registered person has been obtained during the repeated processing (S1707). When it is determined as a result that the authentication condition is not satisfied, the variable n is increased by 1 (S1708) to repeat S1705 and subsequent steps of the matching processing for the next piece of registered data. In the case where checking against all pieces of registered data reveals that the authentication condition is not satisfied with respect to any piece of registered data, a result determining the authentication as a failure is output (S1709).

Whether or not resetting the entire system is requested is then determined (S1710). In the case where the reset is requested, this authentication processing is ended. In the case where the reset is not requested, on the other hand, the server 21 returns to S1702 to wait for an authentication request from a terminal.

In the case where a matching result that satisfies the authentication condition is obtained in S1707, it means that the authentication is a success (S1715) and the invalid period timetable is updated (S1716). The invalid period timetable is updated by substituting the current values of the registered person who has just been successfully authenticated (the registered person ID=n) with values in the inter-terminal travel time database that indicate travel times for traveling from the terminal Q used in this authentication to all other terminals. The registered person n authenticated this time is thus excluded from authentication processing targets for a certain period of time and matching of other registered persons is accordingly sped up.

Once the authentication system is started, values of the invalid period timetable and the travel time database 803 are updated as time progresses. This update processing is executed in parallel with authentication processing, and is illustrated in FIG. 10B.

The first step is processing of waiting for a given period of time (for example, one second which is the interval of updating the table and the database) (S1711). Next, an inter-terminal travel time is calculated for a terminal that is a mobile device based on information about the closest access point, and the travel time database 803 is updated (S1712). One second is then subtracted from values in the invalid period timetable for all terminals and all registered persons (S1713). Thereafter, whether resetting the entire system is requested or not is determined (S1714). In the case where the reset is requested, this processing is ended. In the case where the reset is not requested, on the other hand, the processing returns to S1711 and, after one-second waiting processing, S1712 and subsequent processing steps are repeated.

Consistency between the table and the database is maintained through an update by exclusive control. In the manner described above, the number of pieces of registered data to check against is reduced by the processing of FIGS. 10A and 10B, thereby accomplishing precise and speedy authentication.

While the server 21 manages the invalid period of registered data in the embodiment described above, each terminal may hold the invalid period timetable and the inter-terminal travel time database 803 to manage the invalid period through communication between terminals. In this case, a terminal at which authentication has succeeded transmits the registered person ID of the successfully authenticated user and time information (a time at which the living body has been presented or a time at which the authentication has succeeded) to other terminals, each of which updates the invalid period timetable.

Instead of each terminal performing authentication processing, the server 21 may execute authentication processing and update the invalid period timetable and the inter-terminal travel time database 803 with results of the authentication, to thereby narrow down pieces of registered data to be excluded.

The server 21 may record past statistics of the time elapsed during a travel between terminals to use the recorded statistics information in calculating for each user the relation between a probability distribution about the completion of a travel from one terminal to another terminal and the elapsed time, and to apply the relation to the calculation of the FAR. An example thereof is described below.

Figure 11:
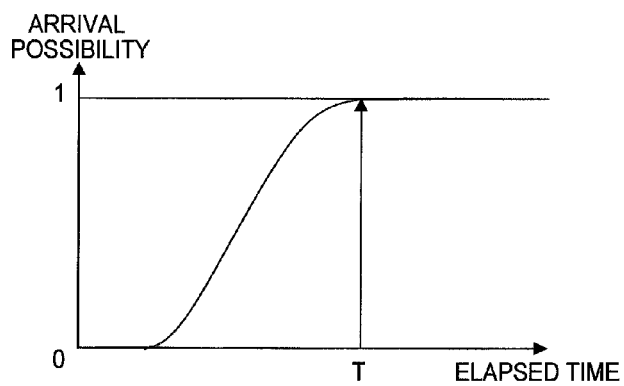
FIG. 11 is a diagram illustrating the relation of an arrival possibility with respect to the elapsed time.

FIG. 11 is a diagram illustrating the relation of an arrival possibility of a user who travels from one terminal X to another terminal Y arriving at the terminal Y with respect to the elapsed time. The axis of abscissa represents the elapsed time and the axis of ordinate represents the arrival possibility.

When the elapsed time is 0, the user cannot complete the travel from the terminal X to the terminal Y and the arrival possibility is 0. When the elapsed time is T, on the other hand, a time long enough for the user to arrive at the terminal Y from the terminal X has elapsed and the arrival possibility is 1. At a time point between the two, the arrival possibility ranges from 0 to 1 depending on the speed of the traveling person and the like, and changes in a continuous manner. This data can be acquired by obtaining the arrival probability from actual measurement, or by estimating the arrival possibility statistically from actual measurement.

When the arrival possibility obtained in this manner is satisfactorily high and the FAR as a match score is satisfactorily low, the user is authenticated as who he/she really is. In the case where the FAR as a match score is low despite a low arrival possibility, the FAR may be converted in manner that prevents the authentication condition from being established. The integrated FAR after the conversion is calculated by, for example, Expression (7).

$$\text{Integrated FAR} = 1 - (\text{arrival possibility} \times (1 - \text{match score FAR})) \quad (7)$$

In other words, when the arrival possibility is satisfactorily high, the converted FAR matches the original match score FAR, whereas the error ratio is higher than the original FAR when the arrival possibility is low, thereby making it difficult for the authentication to succeed and preventing accidental false acceptance.

Fourth Embodiment

Figure 12A:
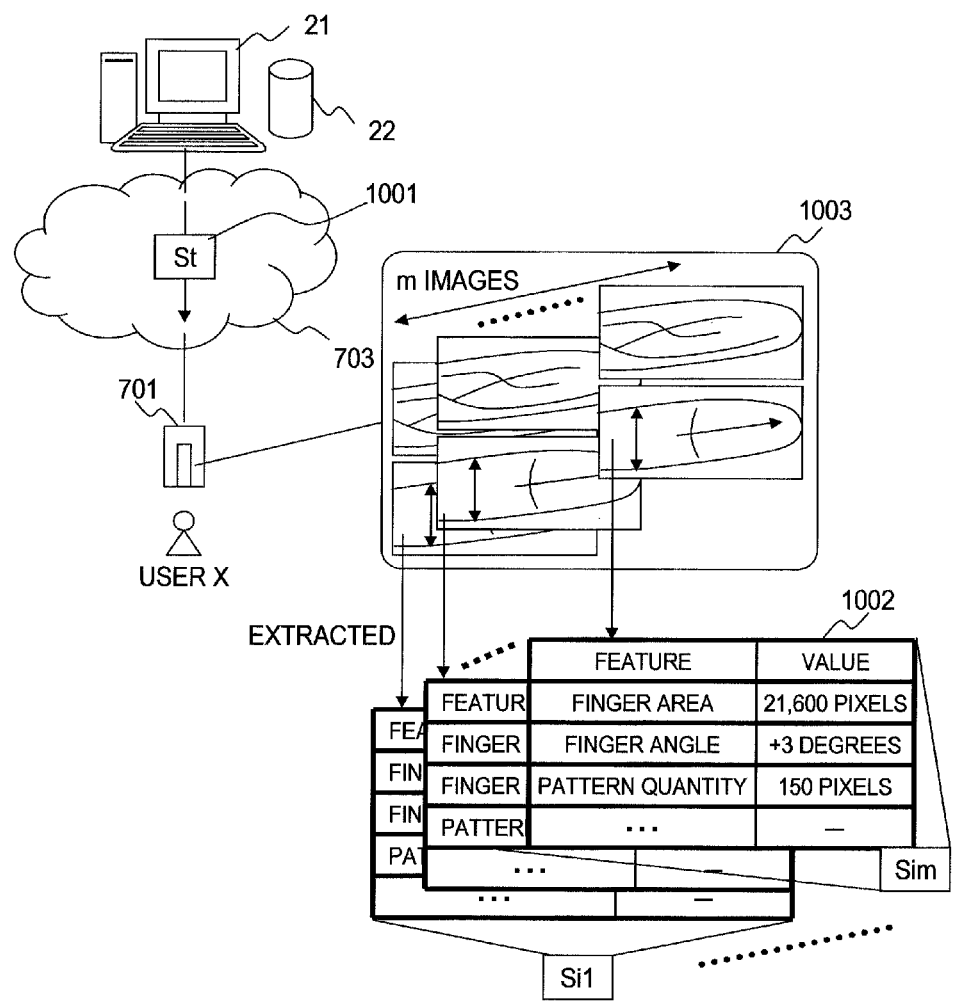
FIG. 12A is a diagram illustrating an overall configuration of a biometric authentication system according to a fourth embodiment.
Figure 12B:
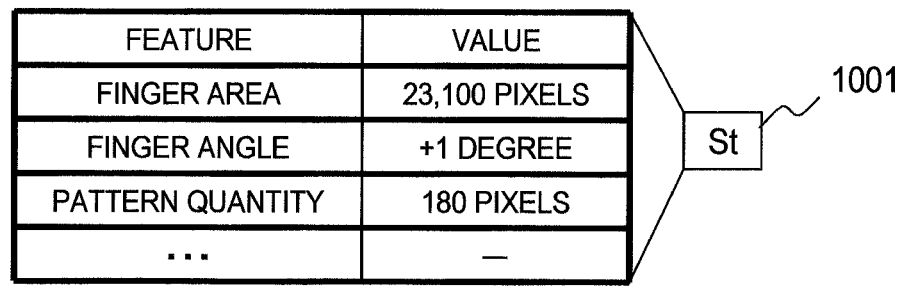
FIG. 12B is a diagram illustrating an example of posture information of a living body according to the fourth embodiment.
Figure 12C:
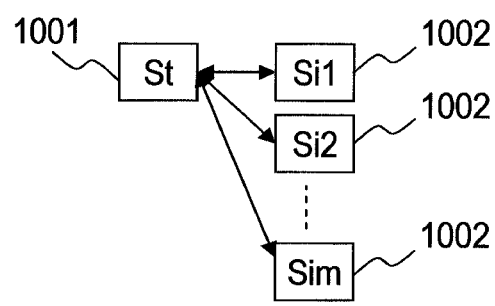
FIG. 12C is a diagram illustrating an example of a matching of the posture information according to the fourth embodiment.

FIGS. 12A to C illustrate a configuration example of an authentication system according to a fourth embodiment of this invention.

The authentication system of the fourth embodiment accomplishes speed improvement or precision improvement of server-based authentication by transmitting information about a posture in which a living body has been photographed.

In the case of what is called client-based authentication in which a processing device of a client terminal checks input data against registered data that is stored therein, living body information may be obtained by photographing in succession to execute matching processing iteratively in synchronization with the photographing speed. An advantage of this method is that, because different postures are photographed in succession, a user can be identified as a registered person even with a slight shift in the posture of a living body from the one at the time of registration, when the match ratio is high with respect to one of the photographed images. The false rejection ratio is thus lowered.

When it is the server 21 that executes authentication processing, on the other hand, a bottleneck in communication may prevent continuous transmission of living body information to the server. The resultant problem is that a failure to execute continuous authentication makes the authentication precision lower than in client-based authentication. If registered data can be transmitted to a client terminal, continuous authentication is accomplished within the client terminal. However, transferring living body information of an individual from the server to the outside entails the risk of a leakage of personal information. It is therefore desirable to avoid transmitting highly personal information.

In contrast, in this invention, an image close to the photographing state at registration is selected from among a plurality of images photographed in succession in a client terminal and the selected image is transferred to the server 21 for authentication, instead of executing continuous authentication on the server 21. The fourth embodiment is described below in detail.

The server 21 holds, in addition to living body information for identifying an individual, registered living body posture information 1001 for each living body. The registered living body posture information 1001 indicates the photographing state of a living body that is not so personal and has no need for secrecy. For example, in the case where finger veins are photographed as living body information, the posture information 1001 can be the finger area, the angle and position at which the finger is placed, the contour of the finger, wrinkle patterns in a finger joint, the photographing angle, the quantity of extracted patterns, main-direction components of finger veins, and the like (see FIG. 12B).

For example, the outline of a finger is obtained by image processing such as edge detection, and the finger area is obtained from the number of pixels inside the outline. The outline information is also used to estimate the central axis of the finger and thereby obtain an angle at which the finger is placed. Information about wrinkles in a finger joint is obtained by photographing with light that irradiates a finger joint and the surroundings, and obtaining a finger joint wrinkle pattern and an average direction of those lines from the photographed image. The coordinates of the position of a finger are obtained from the position of the fingertip or from the position of a wrinkle in a joint. A feature pattern quantity is obtained from the number of pixels that represent veins in a matching template or from the number of feature points. A main-direction component of veins is obtained by, for example, obtaining the representative transit angle of each vein by the least square method or the like, and averaging the transit angles of all veins.

Such posture information as this is extracted at the time of registration, and the extracted posture information is saved along with registered data for matching. The posture information is very small in information amount, for example, approximately one byte per element, and therefore does not cause communication overhead. The finger angle information, for example, does not exceed one byte even when 90 degrees spaced 0.5 degrees apart are stored. The information can be made even smaller by limiting the allowable finger placement range to less than 90 degrees based on the shape of the device such as the finger rest. Alternatively, the one byte may be made full use of by spacing apart the angle more finely.

A user presents an IC card, a PIN, or the like to a terminal 701. The terminal 701 transfers the presented information to the server 21. The server 21 transfers to the terminal 701 the registered posture information 1001 out of registered data that is uniquely associated with the transferred information. Receiving the registered posture information 1001, the terminal 701 prompts the user to present a living body. When the user presents a living body, the terminal 701 photographs the presented living body. An image pickup device such as a camera executes the photographing, and all frames are obtained at the frame rate of the image pickup device. The photographing time is kept to a length that does not make the user feel the photographing inconvenient, for example, a few seconds. In this embodiment, m consecutive images 1003 are photographed.

Thereafter, the same processing as the posture information extracting processing executed at the time of registration is used for all of the plurality of images photographed in succession to extract presented living body posture information 1002. Next, the extracted posture information 1002 is checked against the posture information 1001 transferred from the server 21 which indicates a photographing state at the time of registration, to calculate the degree of difference (see FIG. 12C). The degree of difference is obtained by a common method of determining the degree of difference such as calculating the sum of squares of differences between partial feature amounts, or by calculating the Euclidean distance.

One of the input images whose posture information is closest to the registered data is then selected. The input image selected here is close to the posture which the living body has been in at the time of registration, and is therefore estimated as the closest to the registered data of all the photographed images. The terminal 701 generates matching data from the selected input image, and transfers the matching data to the server 21. The server 21 receives the transferred matching data, checks the received matching data against registered data, and ends the authentication processing.

A conventional method checks a plurality of photographed images (matching data) against registered data. According to the authentication method of the fourth embodiment, only one image that is most likely to resemble registered data is selected and the selected image alone is transferred to the server 21. This reduces the communication amount and gives authentication by the server 21 as high a precision as authentication by the client terminal 701. Instead of transmitting only one selected image to the server 21 as in the fourth embodiment, a plurality of selected images may be transmitted to the server 21.

In the case where each terminal 701 includes a storage device, the terminal 701 may manage only posture information of all pieces of registered data. This eliminates the need to communicate posture information between the server 21 and the terminal 701, thereby reducing the communication amount and quickening response.

Figure 13:
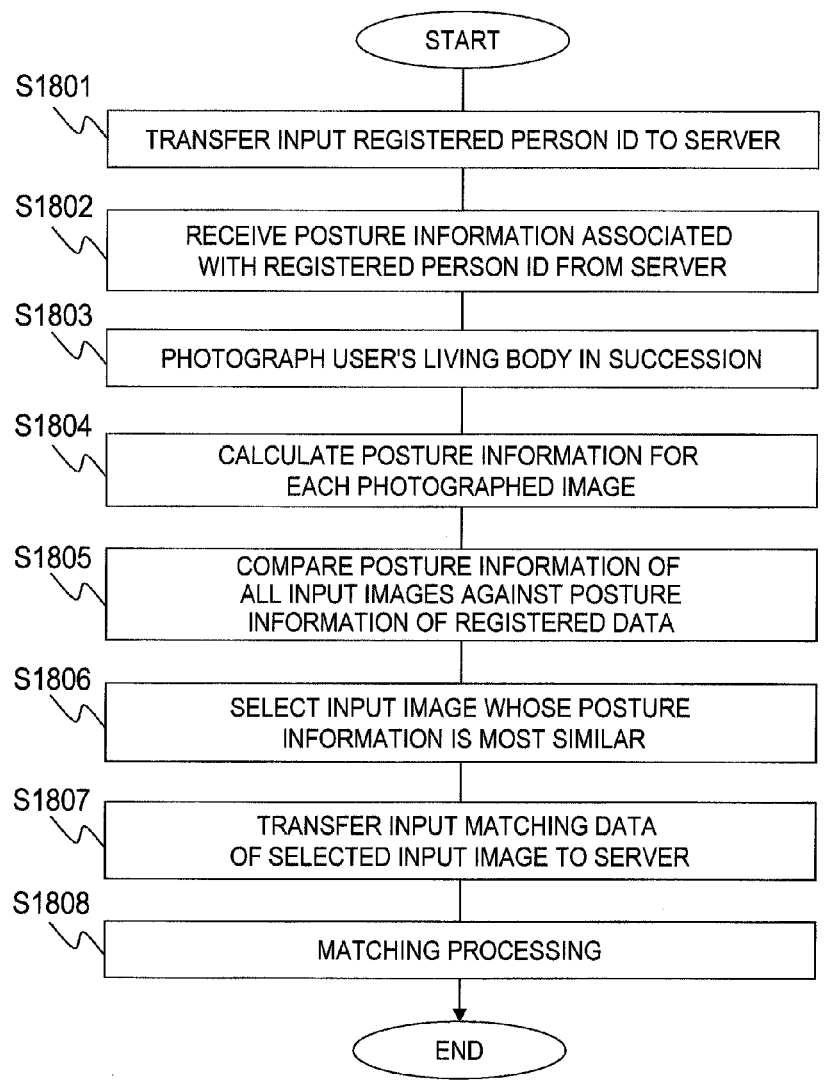
FIG. 13 is a flow chart of processing that is executed by a terminal of the fourth embodiment.

FIG. 13 is a flow chart of processing that is executed by the terminal 701 of the fourth embodiment.

The terminal 701 first receives a registered person ID input by a user, and transfers the received registered person ID to the server 21 (S1801). The ID is input by, for example, inputting numbers via a numerical keypad or the like that the terminal 701 is equipped with, or by reading a registered person ID out of an IC card, a magnetic card, or the like that is presented to a reader.

The server 21 transfers to the terminal 701 posture information out of registered data that is associated with the registered person ID. The terminal 701 receives the posture information associated with the registered person ID from the server 21 (S1802). Thereafter, the terminal 701 photographs a living body of the user, here, finger veins, a plurality of times in succession (S1803). During the successive photographing, the position of the user's finger shifts slightly, with the result that images of the living body in different postures are photographed. The terminal 701 then calculates posture information of each image about a posture which the living body has been in when photographed (S1804). An example of concrete posture information has been given above.

The terminal 701 checks all pieces of posture information of the input data against the posture information of the registered data (S1805). The terminal 701 then selects a piece of input data whose posture information is most similar to that of the registered data (S1806). The terminal 701 extracts matching data from the selected input data, and transfers the extracted matching data to the server 21 (S1807).

This way, one of the images photographed in succession that resembles most in posture to registered data is used for matching processing, and the false rejection ratio is lowered even more in the case where the user is a registered person. The server 21 then checks the matching data transferred from the terminal 701 against the registered data, and determines an authentication result depending on the match score (S1808).

The 1:1 authentication by the server 21 has been described. This method may also be applied to 1:N authentication by the server 21 or the terminal 701 in order to improve precision. A modification example of the fourth embodiment in which 1:N authentication is performed using posture information is described below.

In the case of 1:N authentication, the terminal 701 photographs a plurality of images of a presented living body in succession, extracts feature amounts and posture information for authentication, and transfers the extracted information to the server 21 (or a matching processing unit). Receiving these pieces of information, the server 21 executes matching processing. The server 21 first checks a plurality of pieces of transmitted posture information against posture information of one piece of registered data. A piece of input data that is found as a result to have posture information most similar to that of the registered data is selected, and this input data alone is checked against the registered data. Only one out of a plurality of pieces of input photograph data is thus treated as a matching target. The narrowing down leaves only one of the plurality of pieces of input data that resembles the registered data most in posture to match. Therefore, in the case of living body data of the same person, input data that has high similarity in matching is processed quickly. This processing is executed for every piece of registered data, and the authentication is determined as a success when a matching result that identifies the user as who he/she really is obtained. Narrowing down a plurality of pieces of input data to one piece of input data prevents the matching speed of 1:N authentication from dropping, and makes it possible to match data most likely to resemble registered data. The authentication precision is thus enhanced.

In registration, a plurality of pieces of biometric information varied in posture may be registered. A user is prompted to present a living body a plurality of times and the presented living body is photographed in succession at the time of registration. Living body posture information is extracted from all of the photographed images to selectively register a plurality of photographed images that differ significantly from one another in posture information. Pieces of registered data having a wide range of posture variations are thus generated. Because a plurality of pieces of data are generated in registration, only matching data from one photographed image needs to be communicated when the user makes an input. This eliminates the need to communicate partial feature amounts and lessens network load. However, because the number of pieces of registered data increases, the processing speed may drop particularly in the case where 1:N authentication is executed.

Figure 14:
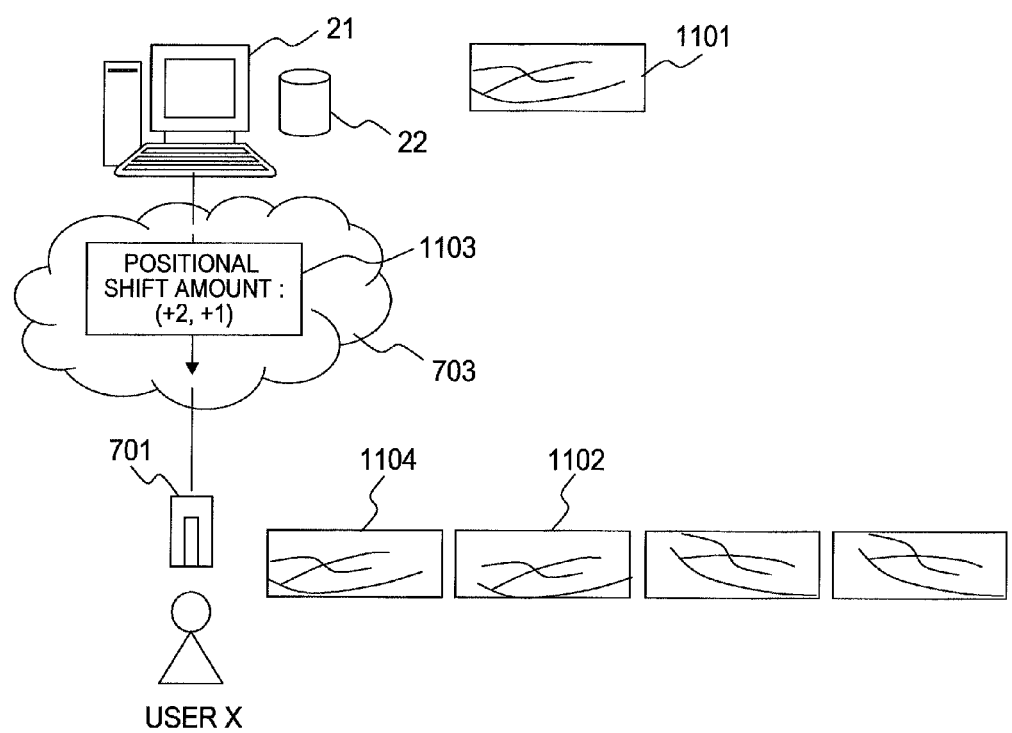
FIG. 14 is a diagram illustrating an operation of the biometric authentication system according to a modified example of the fourth embodiment.

In the case where the response time of authentication by the server 21 is still short after input data is transmitted a few times, a method illustrated in FIG. 14 can be employed. First, registered data is generated from one photographed image, the input living body is photographed a plurality of times in succession, and pieces of input data are generated for all of the photographed images. Of the generated pieces of input data, an arbitrary piece of input data 1102 (for example, data of the last photographed image, data where the living body is photographed most clearly, or data where the living body is photographed in a stationary state) is selected, and the selected input data is transmitted to the server 21 to be checked against all pieces of registered data.

Of the pieces of data checked against, a piece of registered data 1101 has the highest similarity. In this case, authentication is completed when a match score indicating successful authentication is obtained, whereas the server 21 retries when a match score indicating successful authentication is not obtained.

The server 21 first examines the amount of spatial positional shift of the input data 1102 with respect to the registered data 1101. For example, in the case of matching against a template image, the two images are gradually overlapped while shifting the position pixel by pixel, and the positional shift amount is obtained from an overlapped position where the similarity is highest. The server 21 transmits the obtained positional shift amount, which is denoted by 1103, to the terminal 701.

Receiving the positional shift amount 1103, the terminal 701 checks the input data 1102 previously transmitted to the server 21 against all of the input images photographed in succession, and selects an input image 1104 whose positional shift amount is closest to the one transmitted from the server 21. The selected input image 1104 is similar in terms of positional shift to the registered image. The input image 1104 (or input data generated from the input image 1104) is transmitted to the server. In the case where authentication has failed the last time due to a positional shift, input data close to registered data in terms of the amount of positional shift is transmitted, thereby making similarity higher, and the possibility of successful authentication is thus raised.

Figure 15:
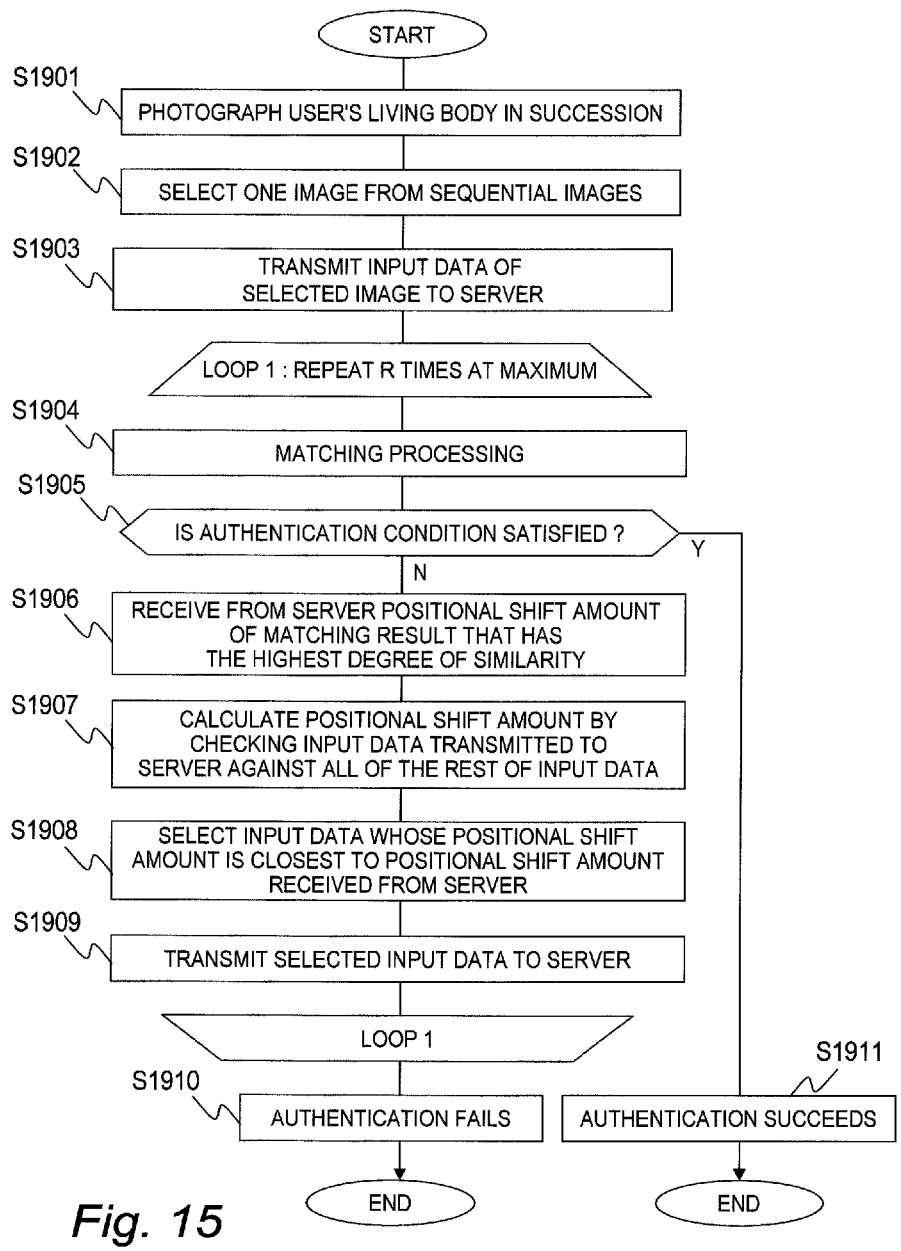
FIG. 15 is a flow chart of processing that is executed by the terminal according to the modification example of the fourth embodiment.

FIG. 15 is a flow chart of processing that is executed by the terminal 701 according to the modification example of the fourth embodiment.

A user first presents finger veins to the terminal 701, which then photographs the finger veins in succession (S1901). The terminal 701 selects one arbitrary image from among the photographed input images (S1902). In an example of how to select an image, an image photographed while the finger is stable and still is chosen. Specifically, the luminance value is compared between consecutive image frames and, when there are a given number of consecutive frames where the difference in average luminance value between images is lower than a given threshold, an image in which the subject is still can be selected by choosing the first of the set of images. The terminal 701 transmits the one piece of selected input data to the server 21 (S1903).

The server 21 checks the transmitted input data against all pieces of registered data (S1904). Thereafter, whether or not the result of matching satisfies the authentication condition is determined (S1905). In the case where the result of matching satisfies the authentication condition, authentication success processing is executed and then this processing is ended (S1911).

In the case where the result of matching does not satisfy the authentication condition, on the other hand, the server 21 calculates the amount of positional shift between patterns whose matching results have the highest similarity to the input data out of all pieces of registered data, and transmits the calculated positional shift amount to the terminal 701. The terminal 701 receives the positional shift amount transmitted from the server 21 (S1906).

The terminal 701 checks the input data transmitted to the server 21 against other pieces of input data to calculate a positional shift amount (S1907). The terminal 701 then compares the positional shift amount transmitted from the server 21 and the positional shift amount obtained by checking pieces of input data against one another, to thereby select a piece of input data that gives a positional shift amount most similar to the positional shift amount transmitted from the server (S1908). However, the input data already transmitted to the server is excluded from selection options. The terminal 701 transmits the selected input data to the server 21 (S1909).

Thereafter, the server 21 returns to S1904 via loop processing to check the selected input data against all pieces of registered data. The server 21 in this step may use the result of previous matching to check against pieces of registered data in descending order of similarity. The server 21 can determine an authentication result at an early stage by checking against pieces of registered data in descending order of similarity.

When it is revealed as a result that the authentication condition is satisfied, the authentication is ended. In the case where the authentication fails, the processing from S1904 to S1909 is repeated for a given number of times R. An arbitrary value equal to or smaller than the number of images photographed as consecutive images can be set as the repetition count R. When authentication still does not succeed after repeating the processing the given number of times, the authentication is determined as a failure (S1910), the user is denied authentication, and the processing is ended.

Fifth Embodiment

Figure 16:
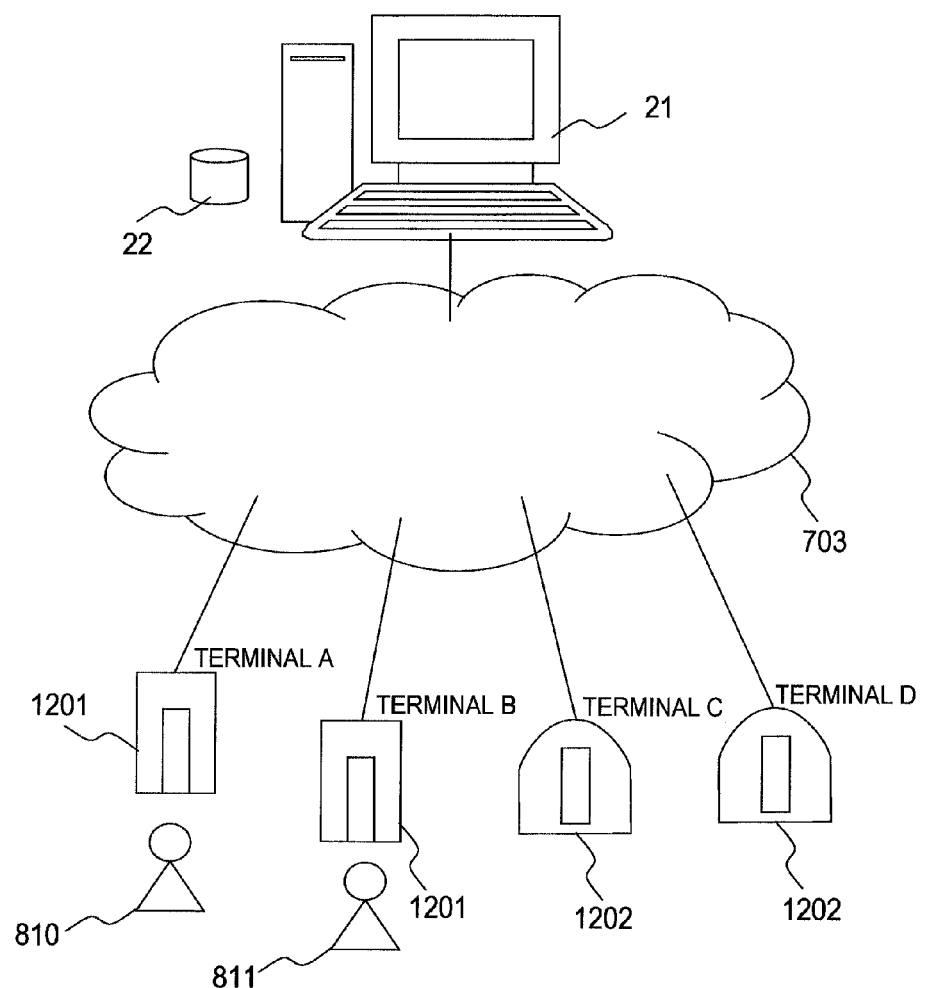
FIG. 16 is a diagram illustrating an overall configuration of a biometric authentication system according to a fifth embodiment.

FIG. 16 illustrates a configuration example of an authentication system according to a fifth embodiment of this invention.

The authentication system of the fifth embodiment is a biometric authentication system in which different authentication devices are mixed.

A plurality of types of biometric authentication devices which use the same living body part are coupled to a network 703. In this embodiment, two types of biometric authentication devices that use finger veins as a living body part, existing devices 1201 and new devices 1202, are connected. The authentication precision and processing speed of a biometric authentication device varies depending on the size, cost, and the like of the device. In the case where an authentication system is expanded by coupling a latest authentication device to the existing authentication system, an older model device and a latest model device are mixed in the authentication system, depending on how the introduction is carried out.

Even though the older model device and the newer model device use the same living body part for authentication and are compatible in data format, differences between the two in sensor performance, infrared ray irradiation method, the shape of an interface for the living body, the position of a photographed site, and the like lower data compatibility (definition compatibility) between an image photographed by one device and an image photographed by the other device. Therefore, adding a new device to a system requires a user who has registered with the older model device in the past to register biometric information again for the new device. When the scale of 1:N authentication is expanded, the time and personnel cost necessary for re-registration increase and a huge management cost is required. If re-registration can be automated, on the other hand, the increase in management cost can be kept minimum. The fifth embodiment shows an example of automating re-registration of biometric information in the case where the existing devices 1201 are terminals that have already been set up and the new devices 1202 are newly introduced to expand the system. Each piece of matching data is given an identifier for determining which type of terminal has created the piece of matching data.

Figure 17A:
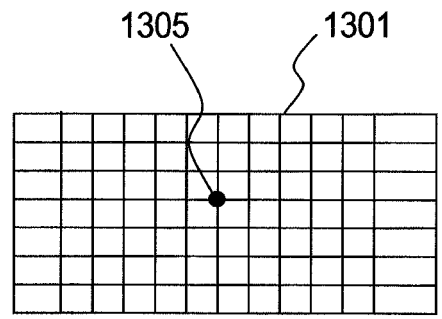
FIG. 17A is a diagram illustrating an example of a test chart according to a fifth embodiment.

First, the two types of devices, the existing devices 1201 and the new devices 1202, are used to photograph a test chart 1301 for calibrating the devices in advance. The test chart includes, for example, a grid made of a plurality of parallel lines as illustrated in FIG. 17A. Each device photographs the test chart 1301, to thereby correct a distortion contained in a photographed image. The chart 1301, which is desirably presented to the device steadily without shifting around, may be shaped in a manner that fixes the chart 1301 to a finger rest of the device, for example, by attaching or printing the chart 1301 to a resin part that is patterned after the shape of a finger. Most finger rests are molded to the shape of a finger, and a finger-shaped test chart can therefore be placed stably in the same position in every finger vein authentication device.

Figure 17B:
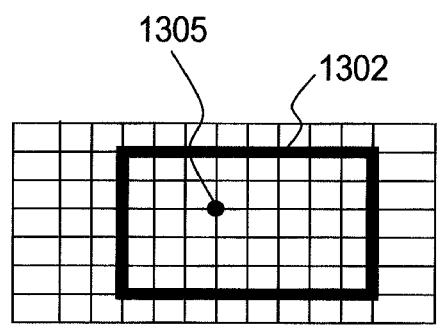
FIGS. 17B to 17D are diagrams illustrating an extraction of a common region by using the test chart according to the fifth embodiment.
Figure 17C:
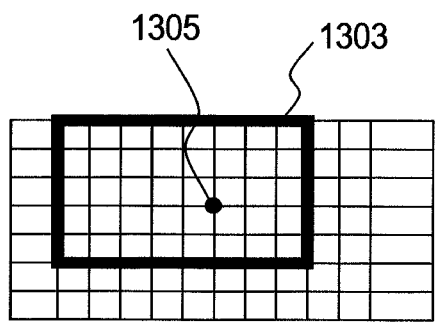
Figure 17D:
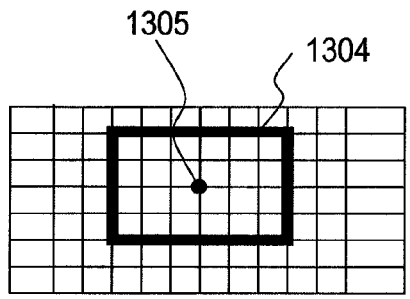

Each existing device 1201 and each new device 1202 photograph images of the chart, and sites photographed by both devices are extracted. For example, the existing device 1201 photographs a region 1302 whose coordinates in the grid are illustrated in FIG. 17B, whereas the new device photographs a region 1303 illustrated in FIG. 17C. The region common to these regions is a region 1304 illustrated in FIG. 17D. A circular marker 1305 is displayed in the grid in order to determine a grid shift amount. The position of the marker 1305 is detected as a reference point to obtain the coordinates of each grid point.

Next, characteristics such as the expansion rate, a trapezoidal distortion, and a fisheye distortion are matched to those of one of the devices by distorting the image photographed by the other device. To accomplish this, a distortion is corrected by highlighting the shape of intersecting points of the grid with an image filter, obtaining intersecting points of the grid, and modifying the image in a manner that aligns the coordinates of the intersecting points in a straight line. Coordinate conversion for the correction can use a common correction formula for a barrel distortion or a pincushion distortion. During the conversion, the parameter may be changed to automatically obtain a parameter (correction formula) that aligns intersecting points of the grid in the straightest line.

The marker 1305 can be detected by detecting a point in surrounding regions of a grid point where black regions are located most. A coordinate conversion association table obtained in this manner is kept in a server 21.

Figure 17E:
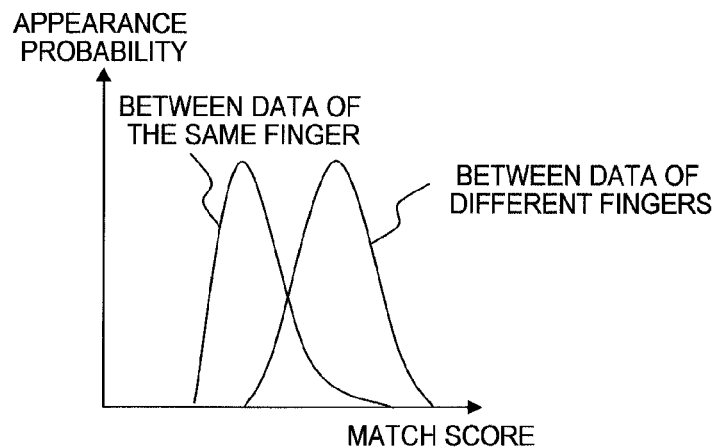
FIGS. 17E and 17F are diagrams illustrating a variation of a match score by a coordinate conversion.
Figure 17F:
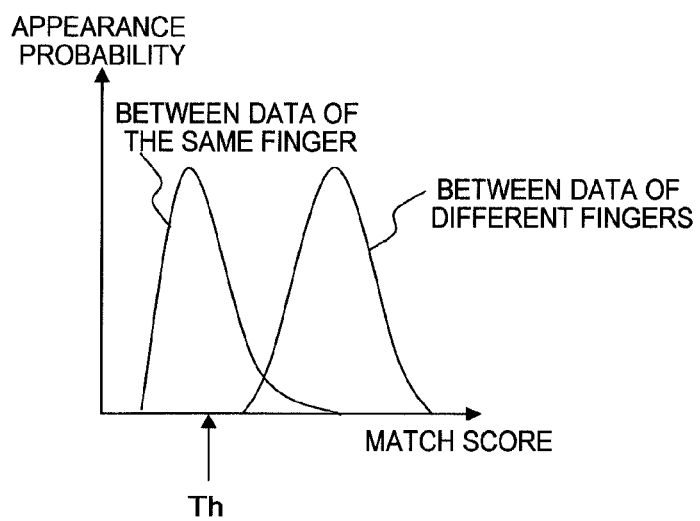

The match score distribution varies between when this conversion is executed and when this conversion is not executed. When the conversion is not executed, as illustrated in FIG. 17E, the degree of difference in matching result between pieces of data of the same finger which should actually have a low match score rises due to distortions in the images or a shift in photographing position. With converted match scores, on the other hand, the degree of separation between the same-finger distribution and the different-finger distribution increases as illustrated in FIG. 17F. However, the original authentication precision cannot be reached by image conversion alone in the authentication between the new device and the old device. Accordingly, this characteristic is utilized to accomplish automation of re-registration.

First, a user who has already registered with an existing device presents a living body to a new device. Next, input data photographed by the new device is checked against all pieces of registered data photographed by the new device. When it is determined as a result that the authentication has not succeeded, whether or not there is registered data photographed by an existing device is determined by the following method. The living body image photographed by the new device is first converted to be closer to an image photographed by the old device in the manner described above. Matching data is extracted from the corrected image and checked against all pieces of registered data photographed by the old device. In the case where the matching data includes image phase information as in an image template, the matching data may be corrected instead of converting the original photographed image. In the case where the image size has been changed through the generation of the matching data, the image correction takes into account the change. This way, a correction can be made with matching data alone when the original photographed image is not saved in registered data or other cases where the original photographed data cannot be used.

When the matching yields a match score indicating that the probability of the user being a different person is lower than a predetermined threshold, for example, a match score lower than Th of FIG. 17F, the current piece of registered data is determined as data of the person in question. In this case, registered data is generated from the information of the living body photographed by the new device, and the generated registered data is saved as registered data for the new device. Registered data for the new device is thus registered automatically, and, from the next time on, authentication by the new device uses the registered data for the new device and authentication by the existing device uses registered data for the existing device. This enables each device to execute authentication suited to the performance of the device. Even when authentication that uses automatically registered data for the new device produces a result that is not lower than Th for some users, re-registration is made unnecessary for many users, and the system running cost is reduced.

In the case where there is still statistically a possibility that the user may be a different person, such as when the obtained match score is around the threshold Th, registered data is updated more accurately by prompting the user to present another finger. The method of combining a plurality of pieces of biometric information described above in the first embodiment can be used at this point. Combining a plurality of pieces of biometric information reduces the probability of erroneous registration to a very low level. The automatic registration of registered data for the new device may follow unique identification of a registered person via the presentation of a registered person ID or a PIN. By identifying a registered person uniquely which means that 1:1 authentication is executed, the risk of false acceptance is lowered and the authentication threshold can be relaxed. This facilitates automatic updating.

Figure 18:
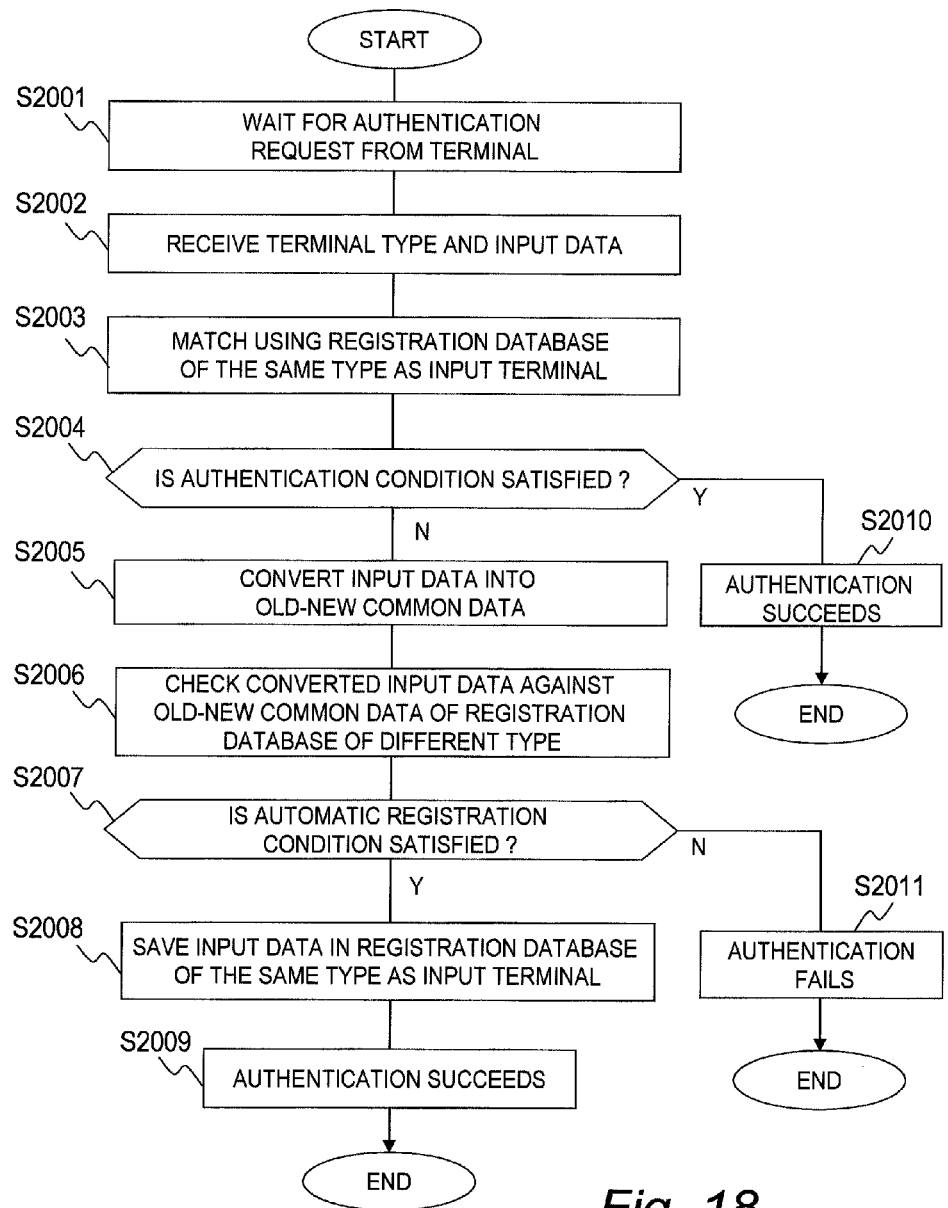
FIG. 18 is a flow chart of the authentication processing according to the fifth embodiment.

FIG. 18 is a flow chart of the authentication processing according to the fifth embodiment.

In the authentication system of the fifth embodiment, the server 21 includes a registration database and authentication processing means that are suited to the old device (terminal) 1201, and a registration database and authentication processing means that are suited to the new device (terminal) 1202. The server 21 also holds parameters for correcting absolute coordinates and distortion of charts which are obtained by presenting the test chart described above to the new device and the old device separately, and executes optimum image conversion between the new device and the old device as described above. Matching data generated in the process is defined as old-new common matching data, and the server 21 holds old-new common matching data generated from the original registered data of the new device and the old device. The server 21 further holds the probability distribution of match scores that are obtained by executing matching of the new device and the old device against each other.

The server 21 first waits for an authentication request from a terminal (S2001). When the user subsequently presents a living body to the terminal, the server 21 receives from the terminal 701 the type of this terminal (information indicating whether the terminal is an existing device or a new device) and input data (S2002).

The server 21 executes authentication processing using the same type of registration database and matching method as the received terminal type (S2003). Whether or not the authentication condition is satisfied is then determined (S2004). When it is found as a result that the authentication condition is satisfied, it means that registered data associated with this input terminal has already been registered. The server 21 accordingly executes authentication success processing and ends this authentication processing (S2010).

When the authentication condition is not satisfied, on the other hand, it means that registered data associated with this input terminal has not been registered yet, or that the user is an outsider who should not be authenticated. The server 21 therefore determines whether or not the user has been registered with a different type of terminal from the input terminal. In the case where the user has been registered with a different type of terminal, registered data that is photographed by the terminal to which the living body is presented (an unregistered device) is automatically saved.

The input data is first converted into old-new common data (S2005). The converted input data is next checked against all pieces of old-new common data of a registration database that is associated with the different type of terminal from the input terminal (S2006). Whether or not a condition for implementing automatic registration is satisfied is then determined (S2007). For example, a threshold for identifying as the same finger is determined in advance from a match score appearance frequency distribution that is prepared in advance by executing matching of the new device and the old device against each other, and whether automatic registration is possible is determined depending on whether a matching result that meets this threshold is obtained in S2006.

In the case where this determination condition is not satisfied, the server 21 determines that automatic registration is not possible, executes authentication failure processing, and ends this authentication processing (S2011). In the case where the determination condition is satisfied, on the other hand, the matching input data received from the input terminals is stored in the same type of registration database as the input terminal, and registered data associated with the new device is thus automatically registered (S2008). In this case, because it has been determined that automatic registration is possible, the person who has presented this living body is naturally determined as a registered person. The authentication success processing is therefore executed (S2009).

It is recommended to set, as the automatic registration condition, the same condition as the authentication condition or a condition stricter than the authentication condition. This is because registering an unauthorized user makes security more vulnerable than accidental false acceptance does.

Sixth Embodiment

Figure 19A:
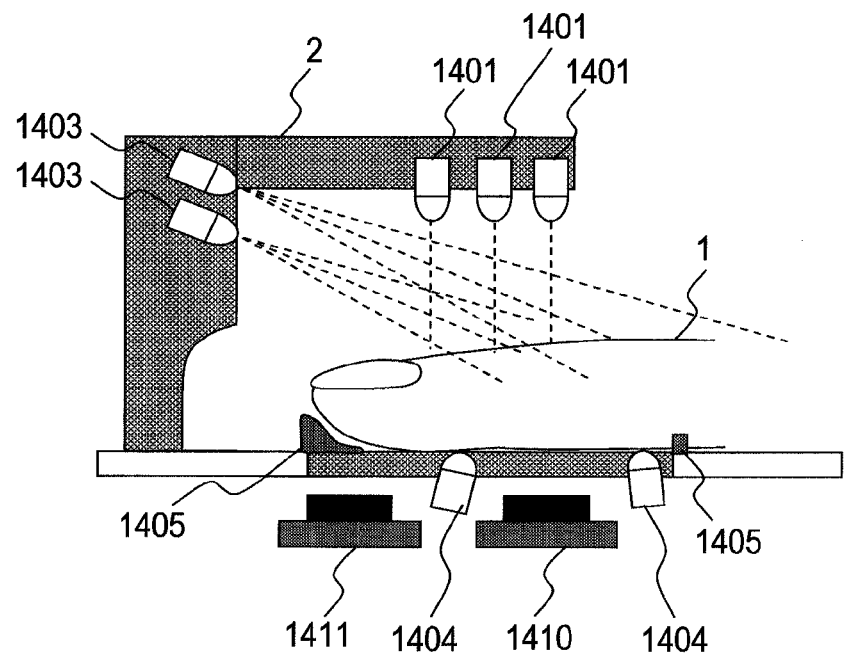
FIGS. 19A and 19B is a diagram illustrating a configuration example of an input device according to a sixth embodiment.
Figure 19B:
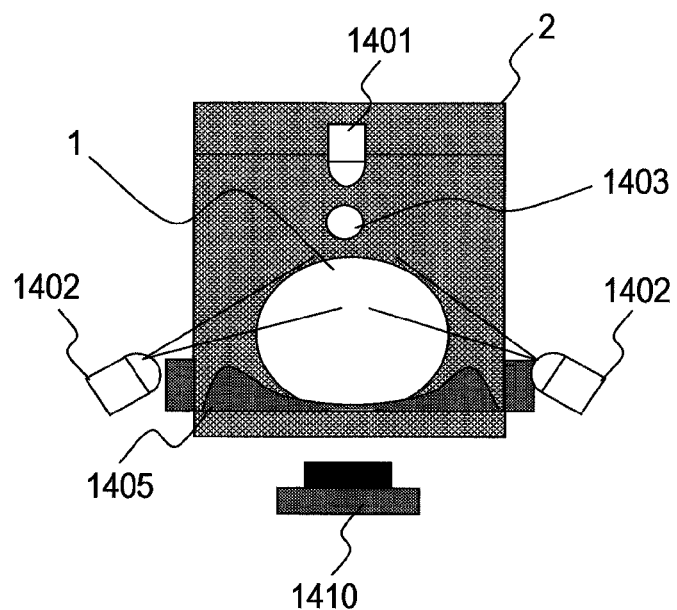

FIGS. 19A and 19B illustrate a configuration example of an input device according to a sixth embodiment of this invention. FIG. 19A is a vertical sectional view of the input device along a finger stretching direction, and FIG. 19B is a vertical sectional view of the input device along a sectional direction of the finger.

The input device of the sixth embodiment is a finger vein registration device which uses various light sources to photograph finger veins. Mixed terminals in a system to which finger veins are presented have various shapes due to differences in device size, cost, and the like, and also have several variations in the arrangement of light sources for photographing finger veins. A registration device for registering biometric information is therefore equipped with light sources arranged in every pattern that can be thought of. By photographing a living body image for generating registered data with use of this registration device, an image that can be used universally by a plurality of types of terminals can be obtained.

The input device 2 has a plurality of light sources, specifically, a top light source 1401, a side light source 1402, which irradiates a finger with light from the left and from the right, a front light source 1403, which irradiates a finger with light from the front, and a bottom light source 1404, which irradiates a finger with right from below. Each of the light sources may be provided with a plurality of light emitting devices depending on the necessary amount of light. The input device 2 also includes a camera 1410, which photographs a central portion of a finger, and a camera 1411, which photographs a fingertip portion. These are provided in order to photograph all sites that are photographed by existing finger vein authentication devices. In the case of providing compatibility with a finger vein authentication device that uses veins in the side of a finger, the input device 2 may have a camera that photographs the side of a finger.

The input device 2 further includes a finger rest 1405 where a user presents a finger. An opening is provided in a central portion of the finger rest 1405. The opening is for photographing a finger on the finger rest 1045 from below with the cameras 1410 and 1411, and is for irradiating a finger on the finger rest 1405 from below with light of the light source 1404.

A user presents a finger 1 at the finger rest 1405. A touch sensor or the like detects the presentation of a finger and then the input device 2 starts photographing. Specifically, the input device 2 photographs the finger while turning on the light sources independently one by one. A difference in light radiated from the light sources causes a difference between images in which finger vein patterns are photographed, and all images obtained by photographing with light radiated from the respective light sources are therefore saved. This makes it possible to photograph an image by the same irradiation method as that of a device connected to the authentication system or that of a device that may be connected to the authentication system in the future, and the photographed image can be used universally as registered data.

Specifically, the top light source 1401 is turned on to photograph with the camera 1410 and with the camera 1411 separately, after adjusting the amount of light for each camera in a manner that makes the average luminance value of the finger region equal between an image that is photographed with the camera 1410 for photographing the central portion of a finger and an image that is photographed with the camera 1411 for photographing the fingertip portion. Next, left-side and right-side light emitting devices of the side light source 1402 are simultaneously turned on to photograph finger veins of the finger irradiated from both sides. Alternatively, the left-side light emitting devices of the side light source 1402 and the right-side light emitting devices of the side light source 1402 may be turned on one after the other to photograph two finger vein images of the finger irradiated from one side. Regions in the two images where the photographing state is good are composited into one finger vein image. The front light source 1403 is further turned on to photograph. Lastly, the finger is irradiated with light of the bottom light source 1404 and photographed. In this manner, the light sources are put into use in turns and adjusted to the amounts of light optimum for the respective cameras in order to photograph a plurality of images sequentially.

The cameras 1410 and 1411 installed in the registration device should be satisfactorily higher in sensitivity and higher in resolution than cameras installed in authentication terminals. Converting a high quality image into a low quality image is easy, and obtaining a high quality registration image therefore enhances the compatibility with various authentication terminals.

When an input device (e.g., an authentication terminal) is connected to the authentication system, the input device 2 notifies the server 21 of terminal specifications such as the resolution, S/N, and other specifications of the cameras, the irradiation method of the light sources, information about which site of the finger is photographed (the pad of the finger, the left side, the right side, the fingertip, the back of the finger, or the like), the position of the photographed region in relation to the fingertip position or the like, and whether or not the outline of the finger is photographed. Receiving the notification, the server 21 extracts, out of images photographed at the time of registration, an image photographed by an irradiation method that matches the irradiation method of this input device, and uses an image filter such as a smoothing filter or a low pass filter to convert the image's resolution into the resolution of this input device. The server 21 further extracts from the registered image a region that corresponds to an image photographed by this input image, then extracts features from the registered image, and saves as registered data. From then on, finger veins input to this input device are authenticated by using the saved registered data.

When another terminal is added to the system, too, an image suited to the added terminal is similarly generated from the specifications of the terminal. Thus, once biometric information is registered with the registration terminal of this embodiment, the registered data can be used universally irrespective of what terminal is connected, thereby saving users the trouble of registering biometric information for each type of authentication terminal, and improving the convenience.

Seventh Embodiment

Figure 20A:
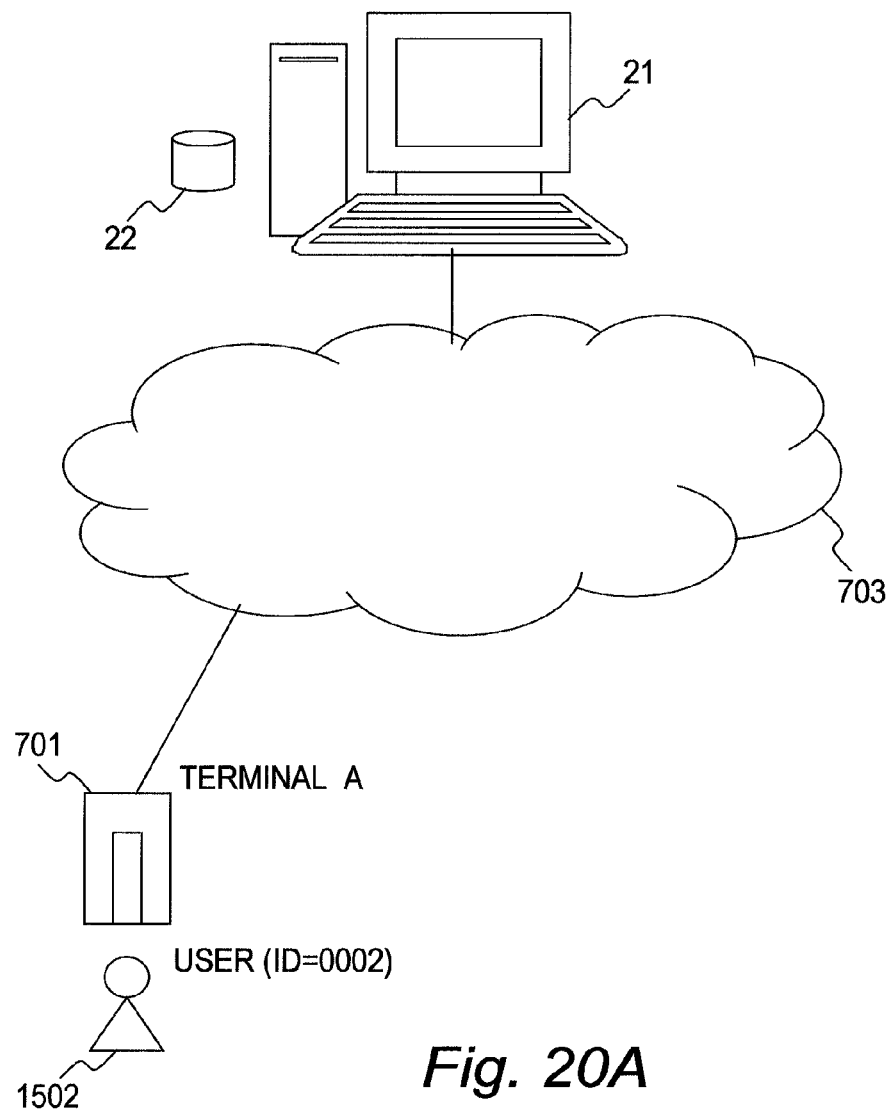

FIGS. 20A and 20B illustrate a configuration example of an authentication system according to a seventh embodiment of this invention.

The authentication system of the seventh embodiment is capable of authentication that is robust against changes with time by switching registration databases depending on the time of day.

A registration database 22 holds registered data that varies depending on the time of day. For example, as illustrated in FIG. 20B, the database is divided into two-hour fields such as 0:00-2:00, 2:00-4:00, and 4:00-6:00, and pieces of registered data sorted by the time slot in which the piece of registered data has been registered are stored in registration databases 1501.

A user registers biometric information before using the system. The registered data is stored in a field corresponding to the time of registration of the data. For example, in the case where a user 1502 whose registered person ID is 0002 registers between 10:00 and 11:59, the registered data is saved in a portion of the time slot-based registration database 1501 that corresponds to the time slot starting at 10:00.

When the user presents a living body for authentication to an authentication terminal 701, registered data of a time slot that is closest to the time at which the living body is presented is used in the authentication. For example, in the case where the user 1502 attempts an input at 12:00, the input data is checked against registered data of which registration time slot is closest to 12:00. For a user whose registered person ID is 0001, for example, data of the 10:00 time slot and data of the 12:00 time slot are registered, and the input data is checked preferentially against the registered data of the 12:00 time slot which is closer to 12:00. For the user whose registered person ID is 0002, data of the 12:00 time slot has not been registered, and the input data is checked against registered data saved in a field for the 10:00 time slot which is closest to the authentication initiation time, 12:00. For a user whose registered person ID is 0003, data of the 12:00 time slot is registered, and the input data is checked against the registered data of the 12:00 time slot. In this manner, all registered person IDs are matched in order by checking preferentially registered data of a time slot that is closest to the time at which authentication has been initiated.

When a match score lower than an authentication threshold is obtained as a result, a registered person ID is identified and the user is successfully authenticated. In the case where the registered person ID of the user 1502 is identified as 0002, data of the 12:00 time slot in which the authentication processing is executed has not been registered in the database, and the input data presented for authentication is therefore registered in the database as registered data 23A. In short, the successfully authenticated input data is registered as registered data in a cell where the registered person ID is 0002 and the time slot starts at 12:00.

As users use the authentication system in various time slots, pieces of biometric information of living bodies photographed in various time slots are accumulated gradually. This allows the authentication system to use registered data that is close to the authentication initiation time in the case where registered data photographed in the morning differs from registered data photographed at night. Accurate authentication is thus accomplished regardless of changes that may occur to biometric information in the course of a day.

Figure 21:
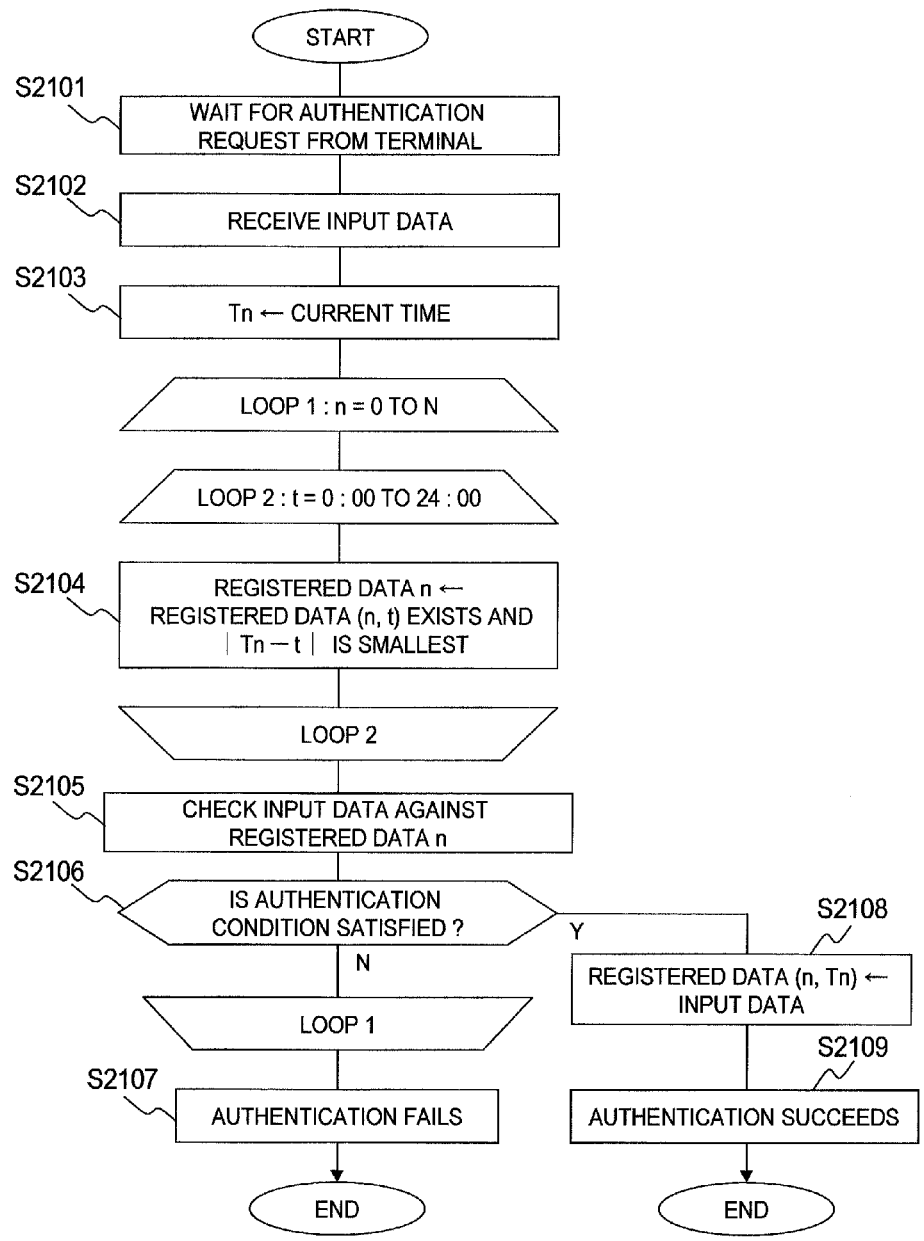
FIG. 21 is a flow chart of the authentication processing according to the seventh embodiment.

FIG. 21 is a flow chart of the authentication processing according to the seventh embodiment.

In the authentication system of the seventh embodiment, registered data is stored in a registration field corresponding to a time slot in which the data has been obtained via photographing. Registered data that is registered in association with a registered person ID n and a registration time t is expressed as registered data (n, t).

A server 21 first waits for an authentication request from the authentication terminal 701 (S2101). The server 21 receives input data from the terminal 701 (S2102), and obtains a data reception time Tn (S2103). Alternatively, Tn may be a time at which the server 21 receives from the terminal 701 a presentation time (a time at which authentication is initiated).

The input data is then checked against all pieces of registered data. A loop (S2104 to S2106) is started when n, which is a variable representing the registered person ID, is 1, and repeated until n reaches N, which is the number of pieces of registered data. In the loop, the server 21 searches for a value of t that ensures the existence of registered data (n, t) and minimizes the absolute value of the difference between the time Tn and the time t, |Tn−t|, when the registration time t is changed from 0 to 24:00, and this registered data is set as registered data n (S2104). In a loop 2, the amount of change of t is varied depending on how long a time interval is set for data registration. For example, in the case where the system is designed so as to register data every hour to keep, t is changed by one hour at a time in the loop 2 to execute S2104.

The input data is then checked against the registered data n (S2105), and whether or not an authentication condition is satisfied is determined (S2106). When it is found as a result that the authentication condition is satisfied, this input data is stores as registered data (n, Tn) (S2108), and authentication success processing is executed (S2106). Through this processing, pieces of biometric information of living bodies photographed in various time slots are saved in the registration database. An added piece of registered data can be used in authentication processing from then on, thereby enabling the system to execute authentication robust against changes that occur to biometric information in the course of a day. In the case where the condition for successful authentication is not satisfied, Steps S2104 to S2106 are repeated for other pieces of registered data. In the case where the authentication condition is still not satisfied after repeating Steps S2104 to S2106, authentication failure processing is executed (S2107) and this authentication processing is ended.

Fields for storing pieces of registered data that are sorted by season may be provided. Furthermore, the terminal 701 may be provided with sensors for measuring the environment of the surroundings such as a thermometer, a hygrometer, and a luxmeter in order to divide registration database fields by the values obtained via the respective sensors. For example, by discriminating data that has been registered when the temperature is 20 degrees to 30 degrees and data that has been registered when the temperature is 10 degrees to 20 degrees, accurate authentication is accomplished regardless of changes that may occur due to temperature. In addition, the authentication threshold may be varied depending on the temperature. The authentication threshold may be relaxed for low temperatures in the case where the authentication precision drops when the temperature is low.

As described, according to the seventh embodiment, authentication suited to the environment surrounding a living body is carried out and the system can thus have an enhanced environmental suitability.

This invention is applicable to large-scale biometric authentication devices, and provides a highly maintainable authentication system capable of precise and speedy authentication, which is useful as a personal authentication device.

Further aspects and embodiments of this invention are set out in the numbered clauses below:

Clauses 1. An authentication system for authenticating an individual by using features of a living body, comprising a plurality of terminals for obtaining information of the living body,
wherein the plurality of terminals each includes:
an input device, on which the living body is out;
an image pickup device for picking up an image of the living body;
an image processing unit for processing the image picked up by the image pickup device;
a storage device for storing a plurality of pieces of feature data including the features of the living body which are registered in advance, and location information for indicating which of the plurality of terminals stores which of the plurality of pieces of feature data;
a matching processing unit for checking input data, which indicates features of a living body picked up by the image device, against the plurality of pieces of feature data; and
a processing unit for determining, for each of the plurality of terminals, whether or not the terminal is in an idle state,
wherein the terminal transmits input data that is generated from an input living body to a terminal that is determined to be in the idle state, and
wherein the terminal that receives the input data checks the received input data against some or all of the of plurality pieces of feature data that are stored in its own storage device.

Clauses 2. The authentication system according to clauses 1, further comprising a server which is coupled to the plurality of terminals,
wherein the server includes a storage device for storing all of the plurality of pieces of feature data, and a matching processing unit for checking the input data against the plurality of pieces of feature data,
wherein the terminal uses the location information in determining to which of the plurality of terminals the plurality of pieces of feature data are transmitted so that the input data is checked against all of the plurality of pieces of feature data stored in each of the plurality of terminals, and
wherein the matching processing unit of the server checks the input data against pieces of feature data that are stored in none of the plurality of terminals.

Clauses 3. The authentication system according to Clauses 1, wherein, in a case where the same piece of feature data is stored in two or more terminals, the terminal determines to which terminals the plurality pieces of feature data are transmitted in a manner that assigns execution of checking against this piece of feature data preferential o one of the two or ore terminals that is low in operating rate.

Clauses 4. An authentication system for authenticating an individual by using features of a living body, comprising:
a plurality of terminals for obtaining information of the living body, the plurality of terminals including at least a first terminal and a second terminal; and
a server coupled to the plurality of terminals,
wherein the plurality of terminals each includes:
an input device, on which the living body is placed;
an image pickup device for picking up an image of the living body; and
an image processing unit for processing the image picked up by the image pickup device,
wherein at least one of the plurality of terminals and the server includes:
a storage device for storing a plurality of pieces of feature data including the features of the living body which are registered in advance, and travel time information including an estimated time necessary for a user to travel between terminals; and
a matching processing unit for checking data, which indicates features of a living body picked up by the image pickup device, against the plurality of pieces of feature data, and
wherein, in a case where a user presents a living body and an authentication is successful at the firs terminal, the travel time information is referred to in order to obtain an estimated time for travel from the first to the second terminal, and the second terminal keeps this user from being successfully authenticated for duration of the obtained estimated time.

Clauses 5. An authentication system for authenticating an individual by using features of a living body, comprising:
a terminal for obtaining information of the living body; and
a server coupled to the terminal,
wherein the terminal includes:
an input device, on which the living body is placed;
an image pickup device for picking up an image of the living body;
an image processing unit for processing the image picked up by the image pickup device;
a storage device for storing a plurality of pieces of feature data including the features of the living body which are registered in advance, and postures that the living body has been in when the plurality of pieces of feature data have been obtained, respectively;
a matching processing unit for checking input data, which indicates features of a living body picked up by the image pickup device, against the plurality of pieces of feature data; and a posture detecting unit for detecting a posture of the input living body, wherein the image pickup device picks up an image of the living body a plurality of times, wherein the posture detecting unit detects a posture that the input body has been in when the image is picked up, and wherein the matching processing unit checks the detected posture of the input living body against the living body postures that correspond to the plurality of pieces of feature data, respectively, and transmits, to the server, input data generated from an image of the living body where the detected posture and one of the living body postures are similar to each other.

Clauses 6. An authentication system for authenticating an individual by using features of a living body, comprising:

a terminal for obtaining information of the living body; and a server coupled to the terminal, wherein the terminal includes:

an input device, on which the living body is placed;

an image pickup device for picking up an image of the living body;

an image processing unit for processing the image picked up by the image pickup device;

a storage device for storing a plurality of pieces of feature data including the features of the living body which are registered in advance; and a matching processing unit for checking input data, which indicates features of a living body picked up by the image pickup device, against the plurality of pieces of feature data, and wherein the server is configured to:

check the input data against the plurality of pieces of feature data; and transmit, to the terminal, information about a positional shift between the input data and one of the plurality of pieces of feature data that resembles the input data most, which is obtained by checking the input data against this feature data.

Clauses 7. The authentication system according to clauses 6, wherein the image pickup device picks up an image of the living body a plurality of times, and wherein the matching processing unit is configured to:

check a piece of input data that has been checked by the server against another piece of input data;

compare the information about the positional shift that is transmitted from the server with positional shift information that is obtained from the checking against the another piece of input data; and check, against the plurality of pieces of registered data, a piece of input data whose positional shift information is most similar to the information about the positional shift that is transmitted from the server.

Clauses 8. An authentication system for authenticating an individual by using features of a living body, comprising:

a plurality of terminals for obtaining information of the living body; and a server coupled to the plurality of terminals, wherein the plurality of terminals each includes:

an input device on which the living body is placed;

an image pickup device for picking up an image of the living body;

an image processing unit for processing the image picked up by the image pickup device;

a storage device for storing a plurality of pieces of feature data including the features of the living body which are registered in an advance; and a matching processing unit for checking data, which indicates features of a living body picked up by the image pickup device, against the plurality of pieces of feature data, and wherein the server generates information for correcting at least one of an image pick up range and image distortion of an image photographed by each of the plurality of terminals.

Clauses 9. The authentication system according to clauses 8, wherein the server is configured to:

check the input data in which the image photographing range and/or distortion has been corrected against the plurality of pieces of feature data;

in a case where it is found as a result of the checking that similarity between the corrected input data and one of the plurality of pieces of feature data satisfies a predetermined condition, generate feature data from an uncorrected original image which has been used to generate the corrected input data; and register the generated feature data.

Clauses 10. An authentication device for authenticating an individual by using veins of a finger, comprising:

a finger rest, on which the finger is placed;

light sources for radiating light toward the finger;

an image device for picking up an image of light transmitted through the finger; and an image processing unit for processing the image picked up by the image pickup device, wherein the light sources are installed as a light source group above the finger, a light source group in front of the finger, light source groups on sides of the finger, and a light source group below the finger, and wherein the image pickup device picks up an image of the living body while one of the light source groups is emitting light.

Clauses 11. The authentication device according to clauses 10, wherein an image picked up while light is emitted from a light source that is positioned in the same place as a light source installed in another authentication device is registered as feature data for the another authentication device.

Clauses 12. An authentication system for authenticating an individual by using features of a living body, comprising:

an input device, on which the living body is placed;

an image pickup device for picking up an image of the living body;

an image processing unit for processing the image picked up by the image pickup device;

a storage device for storing a plurality of pieces of feature data including the features of the living body which are registered in advance; and a matching processing unit for checking input data, which indicates feature of a living body picked by the image pickup device, against the plurality of pieces of feature data, wherein the image processing unit generates input data from the living body image picked up by the image pickup device, and attaches a time at which the living body has been presented to the generated input data, wherein a time at which a living body used to generate the piece of feature data has been presented is attached to each of the plurality of pieces of feature data, and wherein, in a case where the input data is successfully authenticated as a result of checking the input data against one of the plurality of pieces of feature data that has been generated at a time belonging to a different time slot from a time of generation of the input data, the successfully authenticated input data is registered as feature data of the t which the input data has been generated.

Clauses 13. The authentication system according to clauses 12, further comprising a server which is coupled to the plurality of terminals,
wherein the server is configured to:
select one of the plurality of pieces of feature data hose attached time is closest to the time attached to the input data; and
check the input data against the selected one of the plurality of pieces of feature data.

Clauses 14. The authentication s stern according to clauses 12, further comprising a server which is coupled to the plurality of terminals,
wherein information about a temperature at a time a living body used to generate each of the plurality of pieces of feature data has been presented is attached to the piece of feature data, and
wherein the server is configured to:
select one of the plurality of pieces of feature data whose attached temperature information is closest to a temperature of a time at which the input data has been presented; and
check the input data against the selected piece of feature data.

What is claimed is:

1. An authentication system for authenticating an individual by using features of a living body part, comprising:
   an input device including a light, and on which the living body part is placed;
   an image pickup camera for picking up an image of the living body part; and
   at least one central processing unit (CPU) and memory implementing:
   an image processing unit for processing the image picked up by the image pickup camera;
   a storage device for storing a plurality of pieces of first feature data including the features of the living body part which are registered in advance, and a plurality of pieces of second feature data which are generated by the image processing unit from the plurality of pieces of first feature data, respectively; and
   a matching processing unit for matching input data, which indicates features of a living body part picked up by the image pickup camera, against each of the plurality of pieces of first feature data and each of the plurality of pieces of second feature data,
   wherein each of the plurality of pieces of second feature data is data that is smaller in size than each of the plurality of pieces of first feature data and that includes at least a part of the features of the living body part;
   wherein the matching processing unit prompts an input of at least one second living body part, which is different from a first living body part input previously in a case where a predetermined authentication condition is not satisfied, and ends authentication processing when it is determined that an average weighted value of results of the matching that uses the first living body part and results of the matching that uses the at least one second living body part is lower than a predetermined threshold.

2. The authentication system according to claim 1,
wherein the input data includes first input data and second input data,
wherein the first input data is data sized in a manner that makes comparison with the plurality of pieces of first feature data possible,
wherein the image processing unit generates, from each piece of the first input data, second input data sized in a manner that makes comparison with the plurality of pieces of second feature data possible, and
wherein the matching processing unit matches the first input data against each of the plurality of pieces of first feature data after matching the second input data against each of the plurality of pieces of second feature data.

3. The authentication system according to claim 2, wherein the matching processing unit matches the first input data against each of the plurality of pieces of first feature data in an order that is determined based on results of matching the second input data against each of the plurality of pieces of second feature data.

4. The authentication system according to claim 3, wherein the matching processing unit arranges the plurality of pieces of second feature data in descending order of similarity with pieces of second input data, arranges the plurality of pieces of first feature data corresponding to the plurality of pieces of second feature data in this order, and matches the first input data against the plurality of pieces of the first feature data in the same order.

5. The authentication system according to claim 1, wherein the matching processing unit determines how many types of living bodies have been input by the matching input data of the first living body part and input data of the at least one second body in every combination.

6. The authentication system according to claim 1, wherein a relation between match scores and false acceptance ratio which is for determining the predetermined threshold is determined by using results of the matching of different living bodies.

7. The authentication system according to claim 1, the first living body part and the at least one second living body part are different living body part parts of the same person.

8. The authentication system according to claim 1,
wherein the storage device stores a response time allowed before matching processing ends, and
wherein, when the matching is not finished within the response time, the matching processing unit stops the authentication.

9. The authentication system according to claim 8, wherein, even when a predetermined authentication condition is satisfied within the response time, the matching processing unit continues the matching processing until the response time expires.

10. The authentication system according to claim 1, wherein the matching processing unit determines that the authentication has failed in a case where the checking against each of the plurality of pieces of first feature data reveals that a plurality of pieces of first feature data satisfy a predetermined authentication condition, or in a case where the checking against each of the plurality of pieces of second feature data reveals that a plurality of pieces of second feature data satisfies the predetermined authentication condition.

11. The authentication system according to claim 1, wherein the plurality of pieces of second feature data are spatially reduced images of the plurality of pieces of first feature data, respectively.

12. The authentication system according to claim 1,
wherein the storage device stores a threshold determined by a relation between a set of match scores obtained through the matching and a false acceptance ratio, and
wherein the matching processing unit ends authentication processing when it is determined that one of the match scores is lower than the threshold.

* * * * *

UNITED STATES PATENT AND TRADEMARK OFFICE
CERTIFICATE OF CORRECTION

PATENT NO. : 9,076,027 B2  
APPLICATION NO. : 13/510320  
DATED : July 7, 2015  
INVENTOR(S) : Naoto Miura et al.

Page 1 of 1

It is certified that error appears in the above-identified patent and that said Letters Patent is hereby corrected as shown below:

Title Page, at Item (73) Assignee:

"HITACHI INDUSTRY & CONTROL COLUTIONS, LTD., Ibaraki (JP)" should read:
-- HITACHI INDUSTRY & CONTROL SOLUTIONS, LTD., Ibaraki (JP) --

Signed and Sealed this  
Twenty-ninth Day of December, 2015

Michelle K. Lee  
*Director of the United States Patent and Trademark Office*